United States Patent
Miki

(10) Patent No.: US 11,104,374 B2
(45) Date of Patent: Aug. 31, 2021

(54) MOTOR CONTROL DEVICE, ELECTRICALLY DRIVEN ACTUATOR PRODUCT, AND ELECTRICALLY DRIVEN POWER STEERING DEVICE

(71) Applicant: NSK LTD., Tokyo (JP)

(72) Inventor: Yasutoshi Miki, Maebashi (JP)

(73) Assignee: NSK LTD., Tokyo (JP)

( * ) Notice: Subject to any disclaimer, the term of this patent is extended or adjusted under 35 U.S.C. 154(b) by 34 days.

(21) Appl. No.: 16/638,016

(22) PCT Filed: Jul. 12, 2019

(86) PCT No.: PCT/JP2019/027712
§ 371 (c)(1),
(2) Date: Feb. 10, 2020

(87) PCT Pub. No.: WO2020/095479
PCT Pub. Date: May 14, 2020

(65) Prior Publication Data
US 2021/0214000 A1     Jul. 15, 2021

(30) Foreign Application Priority Data

Nov. 8, 2018  (JP) .............................. JP2018-210484

(51) Int. Cl.
*H02P 21/00*     (2016.01)
*B62D 5/04*      (2006.01)
(Continued)

(52) U.S. Cl.
CPC .............. *B62D 5/046* (2013.01); *H02P 21/06* (2013.01); *H02P 27/06* (2013.01)

(58) Field of Classification Search
CPC ................................. H02P 21/06; H02P 27/06
(Continued)

(56) References Cited

U.S. PATENT DOCUMENTS 10,156,832 B2 * 12/2018 Kitamoto ............... G05B 13/02
2011/0127934 A1    6/2011 Suzuki
(Continued)

FOREIGN PATENT DOCUMENTS

JP          2010-51125 A     3/2010
JP          5292995 B2        9/2013
(Continued)

OTHER PUBLICATIONS

European Search Report dated Sep. 29, 2020 in European Application No. 19845810.1.
(Continued)

*Primary Examiner* — Erick D Glass
(74) *Attorney, Agent, or Firm* — Sughrue Mion, PLLC

(57) ABSTRACT

A motor control device including: a voltage command value calculation unit configured to calculate a voltage command value of voltage applied to a motor, based on a q-axis current command value and a d-axis current command value; a driving circuit configured to output driving power to the motor, based on the voltage command value; a d-axis current command value calculation unit configured to calculate the d-axis current command value limiting the voltage command value to a maximum voltage applicable to the driving circuit or less by field-weakening control; a d-axis current command value limitation unit configured to limit the d-axis current command value; and a q-axis current command value limitation unit configured to limit the q-axis current command value lest the voltage command value exceed the maximum voltage due to limitation of the d-axis current command value by the d-axis current command value limitation unit.

8 Claims, 12 Drawing Sheets

(51) Int. Cl.
*H02P 27/06* (2006.01)
*H02P 21/06* (2016.01)

(58) Field of Classification Search
USPC .................................................... 318/400.02
See application file for complete search history.

(56) References Cited

U.S. PATENT DOCUMENTS

| | | |
|---|---|---|
| 2011/0231066 A1 | 9/2011 | Ohno et al. |
| 2014/0152207 A1 | 6/2014 | Sasaki et al. |
| 2014/0285125 A1* | 9/2014 | Kato .................. H02P 21/18 318/400.02 |
| 2014/0312812 A1 | 10/2014 | Sasaki et al. |
| 2017/0072924 A1 | 3/2017 | Kaufmann et al. |
| 2017/0110997 A1 | 4/2017 | Krucinski et al. |
| 2018/0302013 A1* | 10/2018 | Nakano .................. H02P 6/16 |

FOREIGN PATENT DOCUMENTS

| | | |
|---|---|---|
| WO | 2013/021562 A1 | 2/2013 |
| WO | 2013/084461 A1 | 6/2013 |

OTHER PUBLICATIONS

Office Action dated Oct. 5, 2020 in European Application No. 19845810.1.
Written Opinion (PCT/ISA/237) dated Oct. 8, 2019 issued by the International Searching Authority in Application No. PCT/JP2019/027712.

* cited by examiner

MOTOR CONTROL DEVICE, ELECTRICALLY DRIVEN ACTUATOR PRODUCT, AND ELECTRICALLY DRIVEN POWER STEERING DEVICE

This application is a National Stage of International Application No. PCT/JP2019/027712, filed Jul. 12, 2019, claiming priority based on Japanese Patent Application No. 2018-210484 filed on Nov. 8, 2018, the contents of all of which are incorporated herein by reference in their entirety.

TECHNICAL FIELD

The present invention relates to a motor control device driving a motor by means of vector control and an electrically driven actuator product and an electrically driven power steering device including a motor controlled by the motor control device.

BACKGROUND ART

As a technology for, in the vector control of a motor, avoiding duty saturation (voltage saturation), that is, a state in which a voltage command value exceeds a maximum voltage applicable to a driving circuit, and suppressing motor operating noise due to duty saturation, for example, a motor control device described in PTL 1 is known.

The motor control device described in PTL 1 includes a motor control signal generation means for generating motor control signals through execution of current control in the d/q coordinate system and a driving circuit configured to output three-phase driving power to a motor, based on the motor control signals.

The motor control signal generation means estimates an expected voltage utilization ratio, which is a ratio of requested output voltages to the maximum voltage applicable to the driving circuit, based on rotational angular velocity of the motor and current command values in the d/q coordinate system and corrects the current command values lest the estimated expected voltage utilization ratio exceed a predetermined value equivalent to a voltage saturation limit.

Further, the motor control signal generation means calculates a d-axis current command value in order to perform field-weakening control lest the estimated expected voltage utilization ratio exceed the predetermined value and, in conjunction therewith, when the estimated expected voltage utilization ratio exceeds a limit value of a controllable range by the field-weakening control, performs correction by also reducing a q-axis current command value lest the expected voltage utilization ratio exceed the predetermined value.

CITATION LIST

Patent Literature

PTL 1: JP 5292995 B

SUMMARY OF INVENTION

Technical Problem

However, when the d-axis current becomes excessive when performing the field-weakening control, energy efficiency of the motor is reduced and motor operating noise deteriorates. For example, regarding the motor operating noise, associated with proliferation of vehicles having high quietness, such as electric vehicles, the level of quietness that motors and motor control devices used in such vehicles are required to achieve has increased.

The present invention has been made in view of the problem described above, and an object of the present invention is to, while avoiding duty saturation of a motor, limit d-axis current to an arbitrary value.

Solution to Problem

In order to achieve the object mentioned above, according to an aspect of the present invention, there is provided a motor control device including: a voltage command value calculation unit configured to calculate a voltage command value of voltage applied to a motor, based on a q-axis current command value and a d-axis current command value; a driving circuit configured to output driving power to the motor, based on the voltage command value; a d-axis current command value calculation unit configured to calculate the d-axis current command value limiting the voltage command value to a maximum voltage applicable to the driving circuit or less by field-weakening control; a d-axis current command value limitation unit configured to limit the d-axis current command value calculated by the d-axis current command value calculation unit; and a q-axis current command value limitation unit configured to limit the q-axis current command value lest the voltage command value exceed the maximum voltage due to limitation of the d-axis current command value by the d-axis current command value limitation unit.

According to another aspect of the present invention, there is provided an electrically driven actuator product including: a motor control device above; and a motor configured to be controlled by the motor control device.

According to still another aspect of the present invention, there is provided an electrically driven power steering device including: a motor control device above; and a motor configured to be controlled by the motor control device, the electrically driven power steering device providing a steering system of a vehicle with steering assist force, using the motor.

Advantageous Effects of Invention

According to the present invention, it is possible to, while avoiding duty saturation of a motor, limit d-axis current to an arbitrary value.

DESCRIPTION OF EMBODIMENTS

Embodiments of the present invention will be described in detail with reference to the drawings.

Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
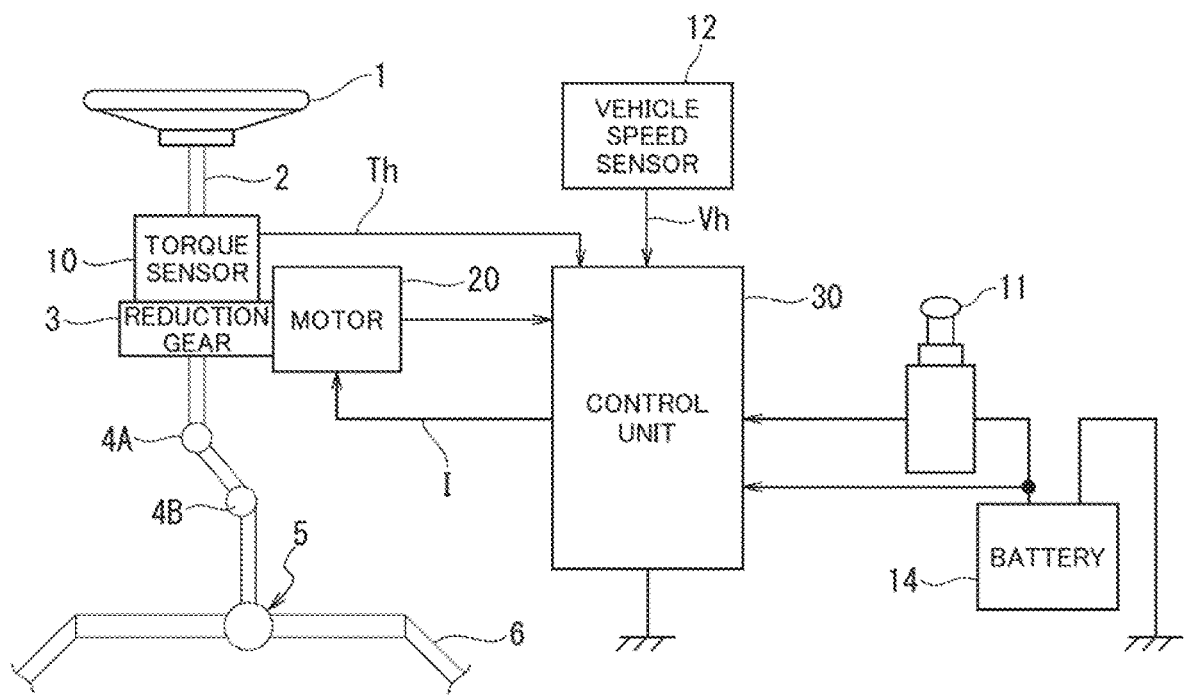
FIG. 1 is a configuration diagram illustrative of an outline of an example of an electrically driven power steering device of embodiments.

A configuration example of an electrically driven power steering device of an embodiment is illustrated in FIG. 1. A column shaft 2 of a steering wheel 1 is joined to a tie rod 6 connecting steered wheels via a reduction gear 3, universal joints 4A and 4B, and a rack-and-pinion mechanism 5. To the column shaft 2, a torque sensor 10 configured to detect steering torque applied to the steering wheel 1 is disposed, and a motor 20 configured to assist steering force of the steering wheel 1 is joined to the column shaft 2 via the reduction gear 3.

To a control unit (ECU) 30 configured to control the power steering device, power is supplied from a battery 14 that is a power supply and, in conjunction therewith, an ignition key signal is input from an ignition key 11, and the control unit 30 performs, based on steering torque Th detected by the torque sensor 10 and vehicle speed Vh detected by a vehicle speed sensor 12, calculation of a steering assist command value of an assist command, using an assist map or the like and controls, based on the calculated steering assist command value, current I to be supplied to the motor 20.

In the electrically driven power steering device having such a configuration as described above, steering torque Th that is generated by steering operation performed by a driver and transmitted from the steering wheel 1 is detected by the torque sensor 10, the motor 20 is drive-controlled by a steering assist command value computed based on the detected steering torque Th and vehicle speed Vh, this drive is provided to a steering system as assist force for steering operation performed by the driver (steering assist force), and the driver can thereby perform steering operation with light force. That is, how the motor 20 is controlled based on a steering assist command value that is computed from steering torque Th output by steering wheel operation and vehicle speed Vh determines whether or not the driver feels easy to perform the steering wheel operation and substantially affects performance of the electrically driven power steering device.

The control unit 30 may, for example, include a computer that includes a processor and peripheral components, such as a storage device. The processor may be, for example, a central processing unit (CPU) or a micro-processing unit (MPU).

The storage device may include any of a semiconductor storage device, a magnetic storage device, and an optical storage device. The storage device may include a register, a cache memory, and a memory, such as a read only memory (ROM) and a random access memory (RAM), that is used as a main storage device.

Note that the control unit 30 may be constituted by dedicated hardware for performing respective information processing, which will be describe below.

For example, the control unit 30 may include functional logic circuits that are implemented in a general-purpose semiconductor integrated circuit. For example, the control unit 30 may include a programmable logic device (PLD), such as a field-programmable gate array (FPGA), or the like.

Figure 2:
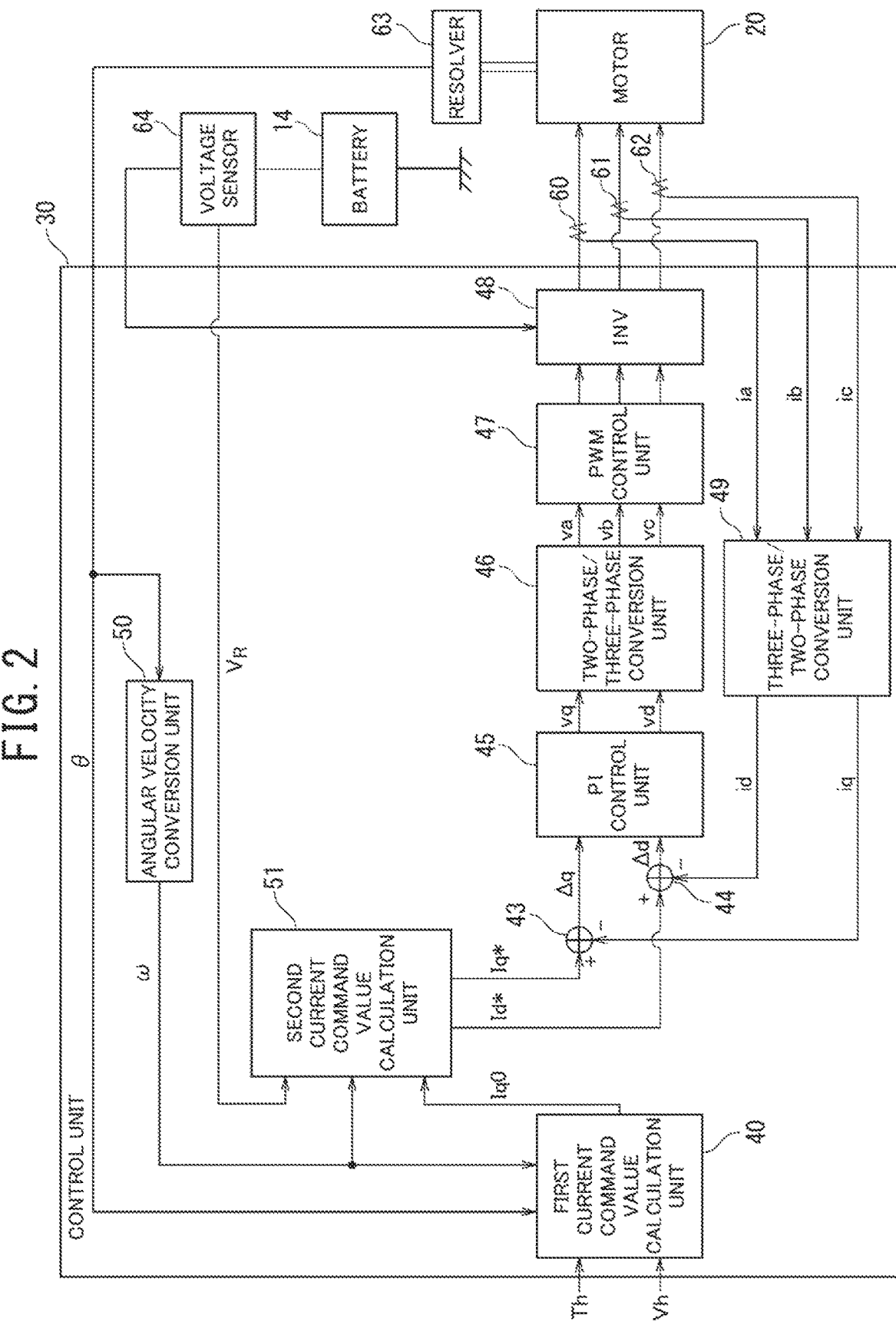
FIG. 2 is a block diagram illustrative of an example of a functional configuration of a control unit of a first embodiment.

With reference to FIG. 2, an example of a functional configuration of the control unit 30 of the first embodiment will be described. The control unit 30 includes a first current command value calculation unit 40, subtractors 43 and 44, a proportional-integral (PI) control unit 45, a two-phase/three-phase conversion unit 46, a PWM control unit 47, an inverter 48, a three-phase/two-phase conversion unit 49, an angular velocity conversion unit 50, and a second current command value calculation unit 51 and drives the motor 20 by means of vector control. Note that an inverter is denoted by "INV" in the accompanying drawings.

Functions of the first current command value calculation unit 40, the subtractors 43 and 44, the PI control unit 45, the two-phase/three-phase conversion unit 46, the PWM control unit 47, the inverter 48, the three-phase/two-phase conversion unit 49, the angular velocity conversion unit 50, and the second current command value calculation unit 51 are achieved by, for example, the processor in the control unit 30 performing computer programs stored in the storage device.

The first current command value calculation unit 40 calculates a base q-axis current command value Iq0 to be flowed to the motor 20, based on steering torque Th and vehicle speed Vh.

The second current command value calculation unit 51 calculates a q-axis current command value Iq* and a d-axis current command value Id* to be flowed to the motor 20, based on the base q-axis current command value Iq0, power supply voltage VR detected by the voltage sensor 64 (that is, inverter applied voltage that is applied to the inverter 48 by the battery 14), and rotational angular velocity ω of the motor 20.

In the calculation, the second current command value calculation unit 51 calculates a q-axis current command value Iq* and a d-axis current command value Id* that cause voltage command values applied to the motor 20 not to exceed a maximum voltage that can be applied to the inverter 48 (that is, the power supply voltage $V_R$). Details of a configuration and operation of the second current command value calculation unit 51 will be described later.

Meanwhile, motor currents ia, ib, and ic provided to the motor 20 are detected by current sensors 60, 61, and 62, respectively, and the detected motor currents ia, ib, and ic are converted to two-axis current composed of a d-axis current id and a q-axis current iq by the three-phase/two-phase conversion unit 49.

The subtractors 43 and 44 compute a q-axis deviation current Δq and a d-axis deviation current Δd by subtracting the fed-back currents iq and id from the q-axis current command value Iq* and the d-axis current command value Id*, respectively. The q-axis deviation current Δq and the d-axis deviation current Δd are input to the PI control unit 45.

The PI control unit 45 computes voltage command values vq and vd that reduce the q-axis deviation current Δq and the d-axis deviation current Δd to 0, respectively. The motor 20 is a three-phase motor, and the two-phase/three-phase conversion unit 46 converts the voltage command values vq and vd to three-phase voltage command values va, vb, and vc.

The PWM control unit 47 generates PWM-controlled gate signals, based on the three-phase voltage command values va, vb, and vc.

The inverter 48 is driven by the gate signals generated by the PWM control unit 47, and, to the motor 20, currents that reduce the q-axis deviation current Δq and the d-axis deviation current Δd to 0 are supplied.

The resolver 63 detects a motor angle (rotation angle) θ of the motor 20, and the angular velocity conversion unit 50 computes a rotational angular velocity ω of the motor 20, based on change in the motor angle θ. These motor angle θ and rotational angular velocity ω are used in the vector control.

Figure 3:
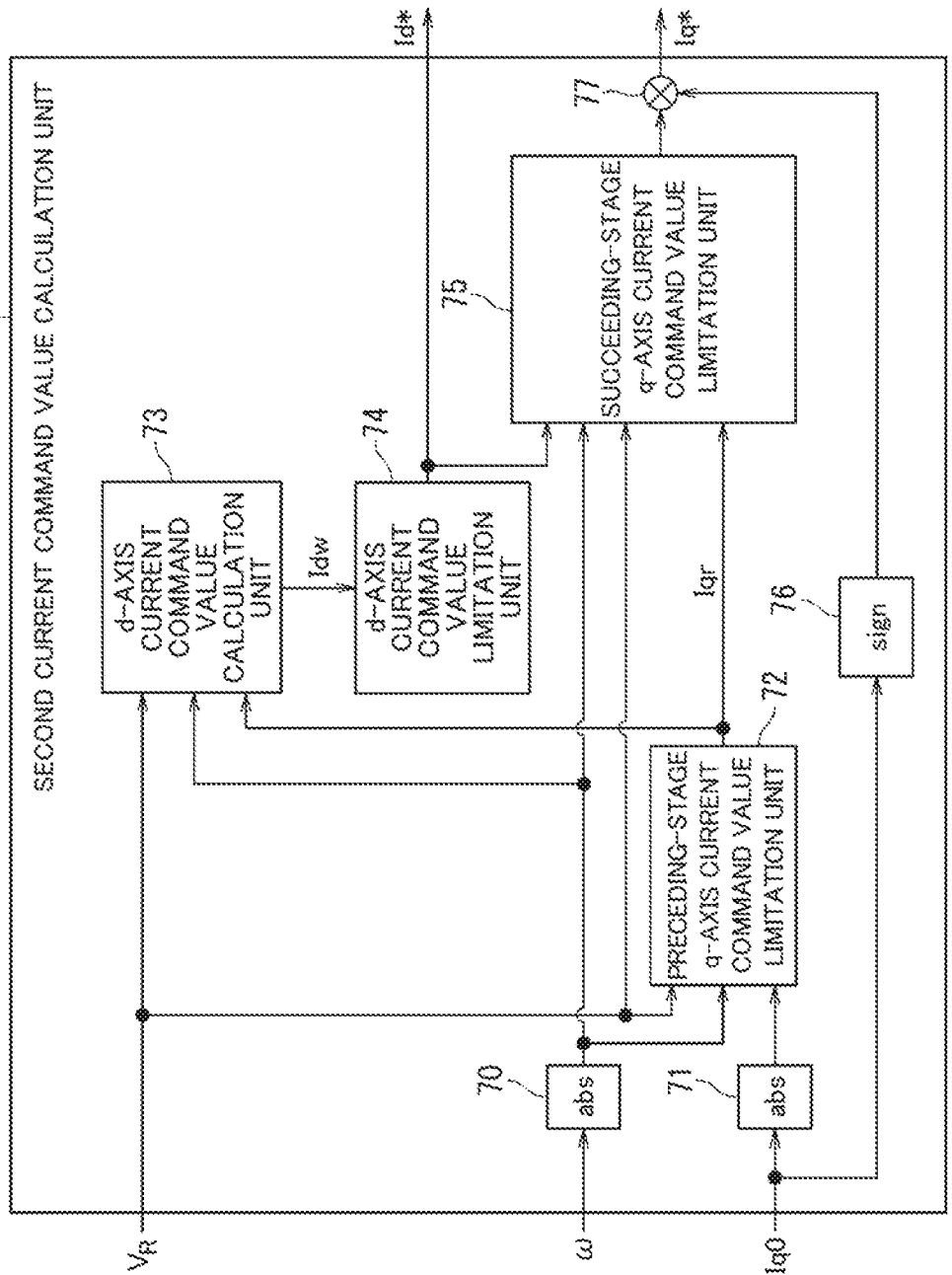
FIG. 3 is a block diagram illustrative of an example of a functional configuration of a second current command value calculation unit of the first embodiment.

Next, a configuration and operation of the second current command value calculation unit 51 will be described. See FIG. 3. The second current command value calculation unit 51 includes absolute value computation units 70 and 71, a preceding-stage q-axis current command value limitation unit 72, a d-axis current command value calculation unit 73, a d-axis current command value limitation unit 74, a succeeding-stage q-axis current command value limitation unit 75, a sign detection unit 76, and a multiplication unit 77. Note that the absolute value computation units and the sign detection unit are denoted by "abs" and "sign", respectively, in the accompanying drawings.

The absolute value computation unit 70 computes the absolute value of the rotational angular velocity ω of the motor 20 and outputs the computed absolute value to the preceding-stage q-axis current command value limitation unit 72, the d-axis current command value calculation unit 73, and the succeeding-stage q-axis current command value limitation unit 75.

The absolute value computation unit 71 computes the absolute value of the base q-axis current command value Iq0 calculated by the first current command value calculation unit 40 and outputs the computed absolute value to the preceding-stage q-axis current command value limitation unit 72.

The preceding-stage q-axis current command value limitation unit 72 determines whether or not the base q-axis current command value Iq0, which is calculated by the first current command value calculation unit 40, exceeds a limit of a range in which the voltage command values va, vb, and vc can be controlled to the power supply voltage VR or less by field-weakening control (that is, a limit of a range in which duty saturation can be avoided by the field-weakening control).

An example of a method for determining whether or not the base q-axis current command value Iq0 exceeds the limit of the range in which duty saturation can be avoided by the field-weakening control will be described below.

An electrical equation of a general surface-mounted permanent magnet motor (SPM motor) is given by the equation (1) below.

[Math 1]

[Math 1]

$$\begin{bmatrix} Vd \\ Vq \end{bmatrix} = \begin{bmatrix} Ls+R & -\omega L \\ \omega L & Ls+R \end{bmatrix} \begin{bmatrix} Id \\ Iq \end{bmatrix} + \begin{bmatrix} 0 \\ \omega \Psi \end{bmatrix} \quad (1)$$

In the equation (1), Vd denotes d-axis voltage, Vq denotes q-axis voltage, L denotes inductance per phase of the motor, R denotes resistance per phase of the motor, w denotes rotational angular velocity (electrical angular velocity) of the motor, s denotes a differential operator, Id denotes d-axis current, Iq denotes q-axis current, and Ψ denotes the number of flux linkages determined based on the motor.

In addition, a relational equation between the power supply voltage VR and the d-axis voltage Vd and the q-axis voltage Vq at a limit at which duty saturation occurs at the time of application of third harmonic compensation is given by the equation (2) below. The third harmonic compensation is processing of, by superimposing a third harmonic on the motor applied voltage and thereby flattening peaks of the applied voltage waveform, making duty saturation unlikely to occur.

[Math 2]

$$V_R^2/3 = V_d^2 - V_q^2 \quad (2)$$

Substituting the equation (2) into the equation (1) and thereby eliminating Vd and Vq and solving the resultant equation with respect to Id result in the equation (3) below that represents the d-axis current at a limit at which duty saturation occurs.

[Math 3]

$$Id = -\frac{\omega^2 \Psi L}{(Ls+R)^2 + \omega^2 L^2} + \sqrt{\frac{V_R^2/3}{(Ls+R)^2 + \omega^2 L^2} - \left\{ Iq + \frac{(Ls+R)\omega\Psi}{(Ls+R)^2 + \omega^2 L^2} \right\}^2} \quad (3)$$

Id represented by the equation (3) being a complex number means that duty saturation cannot be avoided even when the field-weakening control is performed using any d-axis current Id. That is, Id being a complex number means that the q-axis current command value Iq exceeds the limit of the range in which duty saturation can be avoided by the field-weakening control.

Thus, the preceding-stage q-axis current command value limitation unit 72 determines whether or not the base q-axis current command value Iq0 exceeds the limit of the range in which duty saturation can be avoided by the field-weakening control depending on whether or not the square root in the equation (3) becomes a square root of a negative value when the base q-axis current command value Iq0 is substituted into Iq in the equation (3). Note that, as the rotational angular velocity ω and the base q-axis current command value Iq0, absolute values that the absolute value computation units 70 and 71 have computed are used.

When the square root in the equation (3) is a square root of a negative value (that is, the base q-axis current command value Iq0 exceeds the limit of the range in which duty saturation can be avoided), the preceding-stage q-axis current command value limitation unit 72 computes a first q-axis current upper limit value IqLim1 that is given by the equation (4) below. In the computation, as the rotational angular velocity ω, an absolute value that the absolute value computation unit 70 has computed is also used.

The preceding-stage q-axis current command value limitation unit 72 computes, as a limited q-axis current command value Iqr, a command value that is obtained by limiting the base q-axis current command value Iq0 to the first q-axis current upper limit value IqLim1 or less. Limiting the q-axis current Iq to the first q-axis current upper limit value IqLim1 or less causes the square root in the equation (3) to become a square root of a positive value.

[Math 4]

$$IqLim1 = \sqrt{\frac{V_R^2/3}{(Ls+R)^2 + \omega^2 L^2} - \frac{(Ls+R)|\omega|\Psi}{(Ls+R)^2 + \omega^2 L^2}} \quad (4)$$

Note that, when the square root in the equation (3) is a square root of a positive value (that is, the base q-axis current command value Iq0 does not exceed the limit of the range in which duty saturation can be avoided), the preceding-stage q-axis current command value limitation unit 72 does not limit the base q-axis current command value Iq0. The preceding-stage q-axis current command value limitation unit 72 outputs the base q-axis current command value Iq0 as the limited q-axis current command value Iqr as it is.

The preceding-stage q-axis current command value limitation unit 72 outputs the limited q-axis current command value Iqr to the d-axis current command value calculation unit 73 and the succeeding-stage q-axis current command value limitation unit 75.

The d-axis current command value calculation unit 73 computes, as a d-axis current command value Idw for field-weakening control, a d-axis current Id that is obtained by substituting the limited q-axis current command value Iqr into Iq in the equation (3). In the computation, as the rotational angular velocity ω, an absolute value that the absolute value computation unit 70 has computed is also used.

The d-axis current command value Idw for field-weakening control serves as a d-axis current command value that limits the voltage command values va, vb, and vc to the power supply voltage VR. The d-axis current command value calculation unit 73 may compute the d-axis current command value Idw for field-weakening control in such a way that the voltage command values va, vb, and vc become less than the power supply voltage $V_R$.

Note that, when Id in the equation (3) has a positive value, duty saturation does not occur even when the field-weakening control using the d-axis current Id is not performed. For this reason, the d-axis current command value calculation unit 73 sets the d-axis current command value Idw for field-weakening control at 0.

The d-axis current command value calculation unit 73 outputs the d-axis current command value Idw for field-weakening control to the d-axis current command value limitation unit 74.

The d-axis current command value limitation unit 74 computes, as a d-axis current command value Id*, a command value that is obtained by limiting the d-axis current command value Idw for field-weakening control.

For example, the d-axis current command value limitation unit 74 limits the maximum value of the absolute value (magnitude) of the d-axis current command value Id* to an arbitrary upper limit value or less. Limiting the maximum value of the absolute value of the d-axis current command value Id* in this way enables reduction in energy efficiency to be lightened and deterioration in motor operating noise to be lightened. Note that, when the d-axis current command value Idw for field-weakening control is set at 0, the d-axis current command value Id* is set at 0 because it is not required to perform the field-weakening control.

In addition, for example, the d-axis current command value limitation unit 74 limits a change rate of the d-axis current command value Id* to an arbitrary upper limit value or less. Limiting the change rate of the d-axis current command value Id* in this way enables deterioration in motor operating noise to be lightened.

The d-axis current command value limitation unit 74 outputs the d-axis current command value Id* to the succeeding-stage q-axis current command value limitation unit 75.

The limited q-axis current command value Iqr, which is output from the preceding-stage q-axis current command value limitation unit 72, is set at a value at which duty saturation does not occur when the field-weakening control is performed using the d-axis current command value Idw for field-weakening control calculated by the d-axis current command value calculation unit 73.

Since the d-axis current command value Id* is more limited than the d-axis current command value Idw for field-weakening control, the limited q-axis current command value Iqr has a possibility to cause duty saturation to occur when the field-weakening control is performed using the d-axis current command value Id*.

Thus, the succeeding-stage q-axis current command value limitation unit 75 computes, as the q-axis current command value Iq*, a command value that is obtained by limiting the limited q-axis current command value Iqr.

Specifically, solving the equation (3) with respect to the q-axis current Iq results in the equation (5) below that represents an upper limit IqLim2 for the q-axis current at a limit at which duty saturation occurs. The succeeding-stage q-axis current command value limitation unit 75 computes a second q-axis current upper limit value IqLim2 by substituting the d-axis current command value Id* into Id in the equation (5) below. The succeeding-stage q-axis current command value limitation unit 75 uses, as the rotational angular velocity ω, an absolute value that the absolute value computation unit 70 has computed.

[Math 5]

$$IqLim2 = -\frac{(Ls+R)|\omega|\Psi}{(Ls+R)^2 + \omega^2 L^2} + \sqrt{\frac{V_R^2/3}{(Ls+R)^2 + \omega^2 L^2} - \left(Id + \frac{\omega^2 \Psi L}{(Ls+R)^2 + \omega^2 L^2}\right)^2} \quad (5)$$

The succeeding-stage q-axis current command value limitation unit 75 computes, as the q-axis current command value Iq*, a command value that is obtained by limiting the limited q-axis current command value Iqr to the second q-axis current upper limit value IqLim2 or less.

The sign detection unit 76 detects a sign of the base q-axis current command value Iq0 and outputs a sign signal. When the base q-axis current command value Iq0 is positive, the value of the sign signal is set at "1", and, when the base q-axis current command value Iq0 is negative, the value of the sign signal is set at "−1". The multiplication unit 77 makes the sign of the q-axis current command value Iq* coincide with the sign of the base q-axis current command value Iq0 by multiplying the q-axis current command value Iq*, which is output from the succeeding-stage q-axis current command value limitation unit 75, by the sign signal.

Note that the PI control unit 45 and the two-phase/three-phase conversion unit 46 are examples of a voltage command value calculation unit described in CLAIMS. The inverter 48 is an example of a driving circuit described in CLAIMS. The control unit 30 and the voltage sensor 64 are examples of a motor control device described in CLAIMS. The power supply voltage $V_R$ is an example of a maximum voltage applicable to the driving circuit that is described in CLAIMS. The succeeding-stage q-axis current command value limitation unit 75 is an example of a q-axis current command value limitation unit described in CLAIMS. The first current command value calculation unit 40 is an example of a q-axis current command value calculation unit described in CLAIMS. The preceding-stage q-axis current command value limitation unit 72 is an example of a second q-axis current command value limitation unit described in CLAIMS.

Action of Embodiment

Figure 4A:
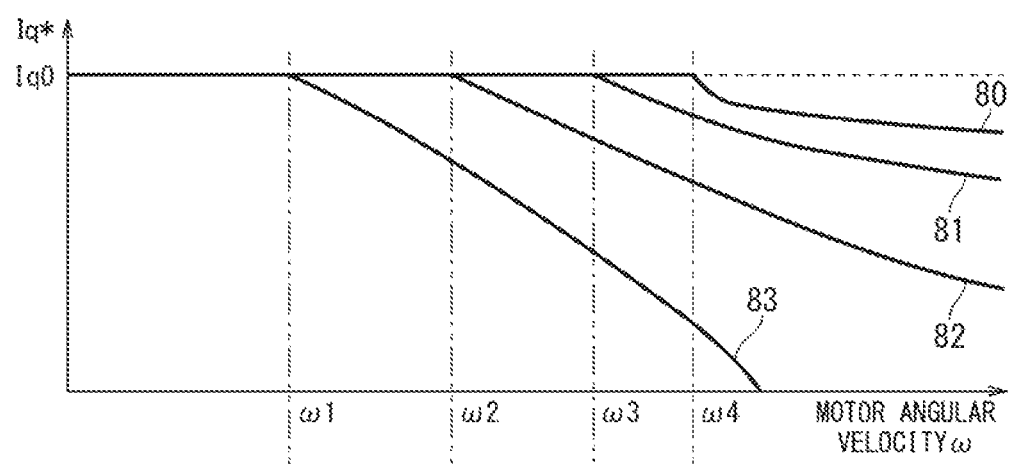
FIG. 4A is a graph broadly illustrative of a relationship between q-axis current command values and motor rotational angular velocity when the magnitude of a d-axis current command value is limited.
Figure 4B:
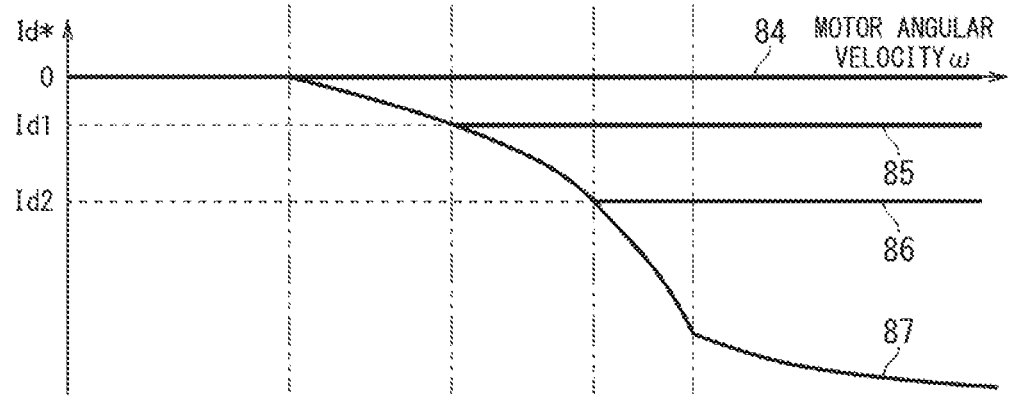
FIG. 4B is a graph broadly illustrative of relationships between the limited d-axis current command values and the motor rotational angular velocity.

With reference to FIGS. 4A and 4B, states in which the q-axis current command value Iq* is limited when increase in the absolute value of the d-axis current command value Id* with respect to increase in the rotational angular velocity of the motor 20 is limited by arbitrary values will be described.

Solid lines 84, 85, and 86 in FIG. 4B illustrate relationships between the d-axis current command value Id* and the motor rotational angular velocity ω when the minimum value (that is, the maximum value of the absolute value) of the d-axis current command value Id* is limited to 0, Id1, and Id2, respectively, and a solid line 87 illustrates a relationship between the d-axis current command value Id* and the motor rotational angular velocity ω when the d-axis current command value Id* is not limited.

On the other hand, solid lines 83, 82, and 81 in FIG. 4A illustrate relationships between the q-axis current command value Iq* and the motor rotational angular velocity ω when the minimum value of the d-axis current command value Id* is limited to 0, Id1, and Id2, respectively, and a solid line 80 illustrates a relationship between the q-axis current command value Iq* and the motor rotational angular velocity ω when the d-axis current command value Id* is not limited.

For example, when the minimum value of the d-axis current command value Id* starts to be limited to 0 at a motor rotational angular velocity ω1, as illustrated by the solid line 84, limitation of the q-axis current command value Iq* using the second q-axis current upper limit value IqLim2 by the succeeding-stage q-axis current command value limitation unit 75 starts and the q-axis current command value Iq* starts decreasing in response to the limitation of the d-axis current command value Id*, as illustrated by the solid line 83.

In addition, when the minimum value of the d-axis current command value Id* starts to be limited to Id1 at a motor rotational angular velocity ω2, as illustrated by the solid line 85, limitation of the q-axis current command value Iq* using the second q-axis current upper limit value IqLim2 starts and the q-axis current command value Iq* starts decreasing in response to the limitation of the d-axis current command value Id*, as illustrated by the solid line 82.

In addition, when the minimum value of the d-axis current command value Id* starts to be limited to Id2 at a motor rotational angular velocity ω3, as illustrated by the solid line 86, limitation of the q-axis current command value Iq* using the second q-axis current upper limit value IqLim2 starts and the q-axis current command value Iq* starts decreasing in response to the limitation of the d-axis current command value Id*, as illustrated by the solid line 81.

In addition, when the d-axis current command value Id* is not limited, as illustrated by the solid line 87, limitation of the q-axis current command value Iq* using the first q-axis current upper limit value IqLim1 starts and the q-axis current command value Iq* starts decreasing when the base q-axis current command value Iq0 exceeds the limit of the range in which duty saturation can be avoided by the field-weakening control at a motor rotational angular velocity ω4.

Figure 5A:
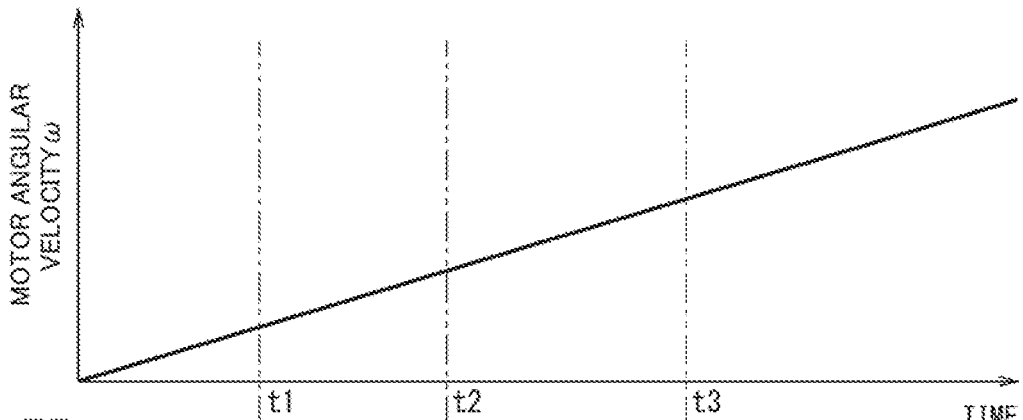
FIG. 5A is a graph illustrative of temporal change of motor rotational angular velocity $\omega$.
Figure 5B:
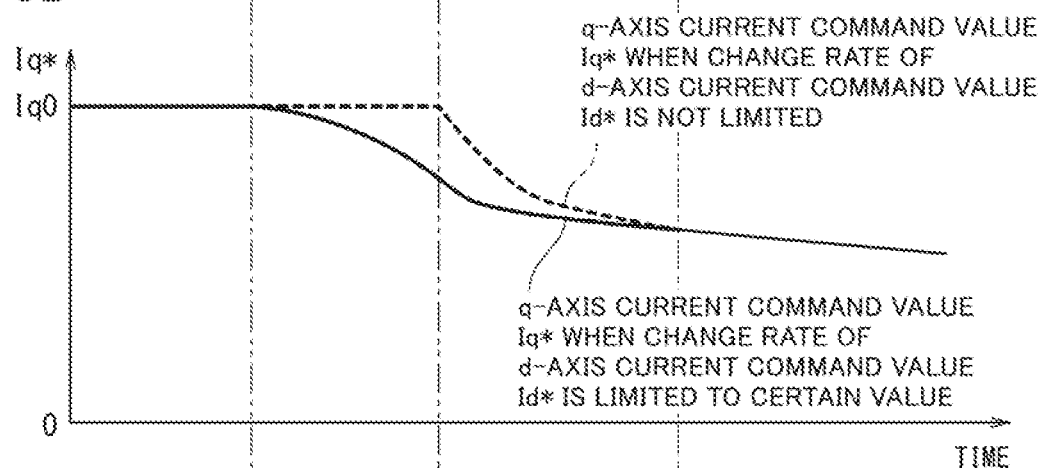
FIG. 5B is a graph broadly illustrative of temporal change of the q-axis current command value when a temporal change rate of the d-axis current command value is limited.
Figure 5C:
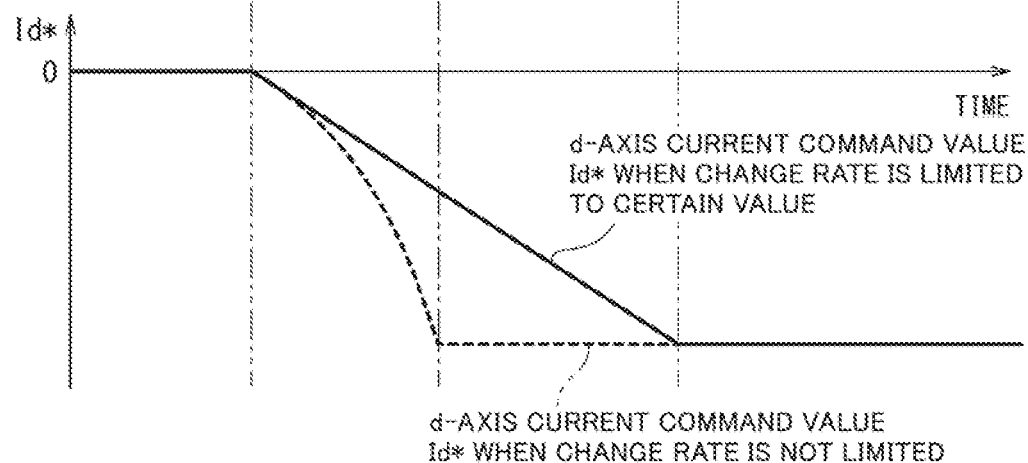
FIG. 5C is a graph broadly illustrative of temporal change of the d-axis current command value the temporal change rate of which is limited.

With reference to FIGS. 5A, 5B, and 5C, states in which the q-axis current command value Iq* is limited when the change rate of the d-axis current command value Id* is limited to an arbitrary value will be described.

FIG. 5A illustrates temporal change in the motor rotational angular velocity ω, and the solid line and the dashed line in FIG. 5C illustrate temporal change in the d-axis current command value Id* when the change rate of the d-axis current command value Id* is limited to a certain value and temporal change in the d-axis current command value Id* when the change rate of the d-axis current command value Id* is not limited, respectively.

The solid line and the dashed line in FIG. 5B illustrate temporal change in the q-axis current command value Iq* when the change rate of the d-axis current command value Id* is limited to a certain value and temporal change in the q-axis current command value Iq* when the change rate of the d-axis current command value Id* is not limited, respectively.

As illustrated in FIG. 5C, during a period from t1 to t3, the absolute value of the limited d-axis current command value Id* (solid line) is less than the value when not limited (dashed line) because of the limitation of the temporal change in the d-axis current command value Id*. As a result, during the period from t1 to t3, the q-axis current command value Iq* is also limited.

Note that, when temporal change in decrease in the absolute value of the d-axis current command value Id* is limited by the d-axis current command value limitation unit 74 and the absolute value of the limited d-axis current command value Id* becomes greater than the value when not limited, there is no possibility that the q-axis current command value Iq* is limited by the succeeding-stage q-axis current command value limitation unit 75.

Operation

Figure 6:
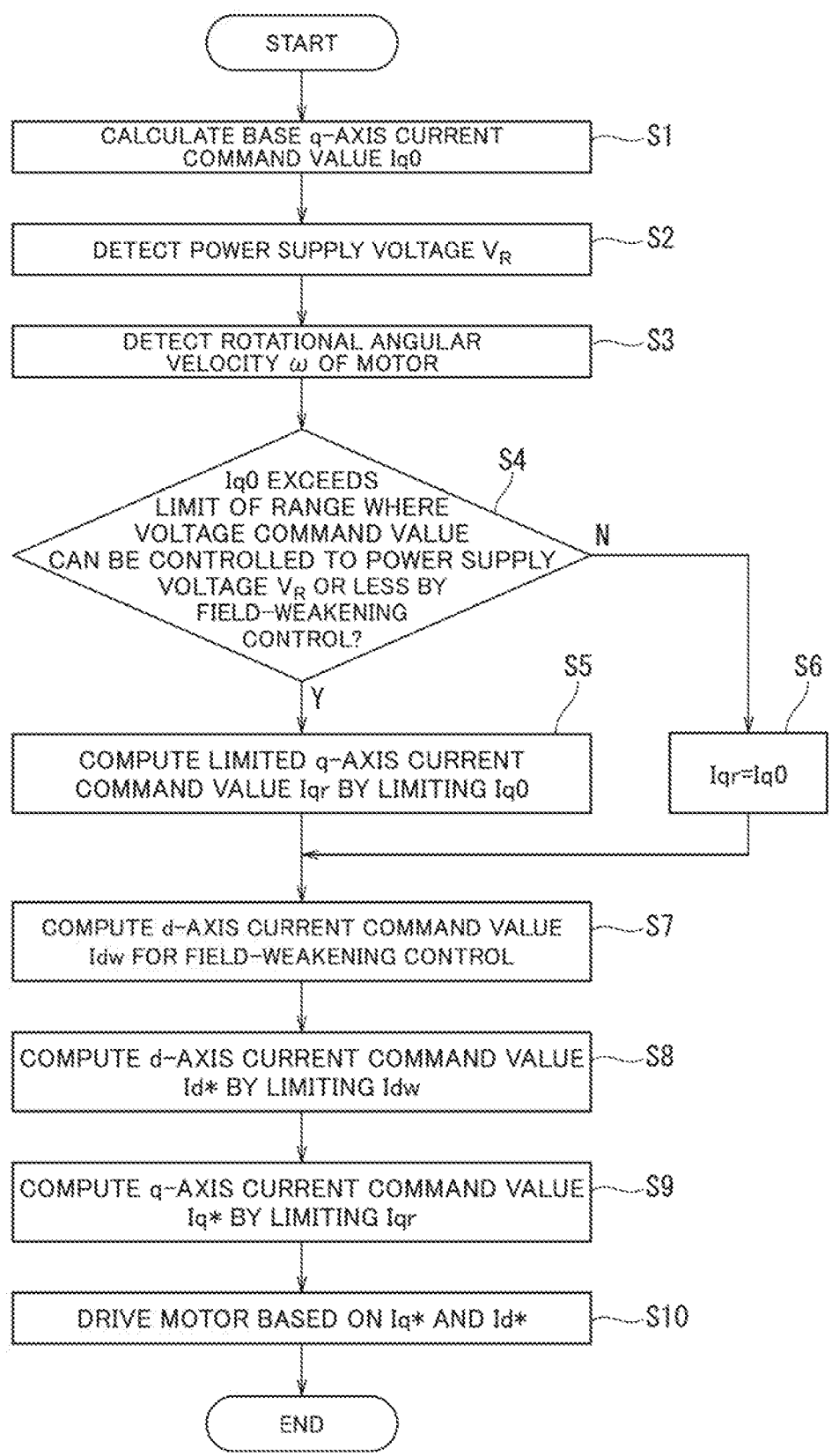
FIG. 6 is a flowchart of an example of a motor control method of the embodiment.

Next, with reference to FIG. 6, an example of the motor control method of the embodiment will be described.

In step S1, the first current command value calculation unit 40 calculates a base q-axis current command value Iq0 to be flowed to the motor 20.

In step S2, the voltage sensor 64 detects a power supply voltage $V_R$ that is applied to the inverter 48 by the battery 14.

In step S3, the resolver 63 and the angular velocity conversion unit 50 detect a rotational angular velocity ω of the motor 20.

In step S4, the preceding-stage q-axis current command value limitation unit 72 determines whether or not the base q-axis current command value Iq0 exceeds a limit of a range in which a voltage command value can be controlled to the power supply voltage VR or less by the field-weakening control, based on the equation (3). When the base q-axis current command value Iq0 exceeds the limit (Y in step S4), the processing proceeds to step S5. When the base q-axis current command value Iq0 does not exceed the limit (N in step S4), the processing proceeds to step S6.

In step S5, the preceding-stage q-axis current command value limitation unit 72 computes a first q-axis current upper limit value IqLim1 given by the equation (4). The preceding-stage q-axis current command value limitation unit 72 computes, as a limited q-axis current command value Iqr, a command value that is obtained by limiting the base q-axis current command value Iq0 to the first q-axis current upper limit value IqLim1 or less. Subsequently, the processing proceeds to step S7.

In step S6, the preceding-stage q-axis current command value limitation unit 72 outputs the base q-axis current command value Iq0 as the limited q-axis current command value Iqr as it is. Subsequently, the processing proceeds to step S7.

In step S7, the d-axis current command value calculation unit 73 computes a d-axis current command value Idw for field-weakening control, based on the equation (3) and the limited q-axis current command value Iqr.

In step S8, the d-axis current command value limitation unit 74 computes, as a d-axis current command value Id*, a command value that is obtained by limiting the d-axis current command value Idw for field-weakening control.

In step S9, the succeeding-stage q-axis current command value limitation unit 75 computes a second q-axis current upper limit value IqLim2, based on the equation (5) and the d-axis current command value Id*. The succeeding-stage q-axis current command value limitation unit 75 computes, as a q-axis current command value Iq*, a command value that is obtained by limiting the limited q-axis current command value Iqr to the second q-axis current upper limit value IqLim2 or less.

In step S10, the subtractors 43 and 44, the PI control unit 45, the two-phase/three-phase conversion unit 46, the PWM control unit 47, the inverter 48, and the three-phase/two-phase conversion unit 49 drive the motor 20, based on the q-axis current command value Iq* and the d-axis current command value Id*. Subsequently, the processing is terminated.

Advantageous Effects of First Embodiment (1) The motor control device of the first embodiment includes the PI control unit 45 and the two-phase/three-phase conversion unit 46 configured to calculate a voltage command value of voltage applied to the motor 20, based on a q-axis current command value and a d-axis current command value, the inverter 48 configured to output driving power to the motor 20, based on the voltage command value, the d-axis current command value calculation unit 73 configured to calculate a d-axis current command value that limits a voltage command value to a power supply voltage $V_R$ or less by field-weakening control, the d-axis current command value limitation unit 74 configured to limit the d-axis current command value calculated by the d-axis current command value calculation unit 73, and the succeeding-stage q-axis current command value limitation unit 75 configured to limit the q-axis current command value lest the voltage command value exceed the power supply voltage $V_R$ because of limitation of the d-axis current command value by the d-axis current command value limitation unit 74.

This configuration enables duty saturation to be avoided even when the d-axis current command value to be used for the field-weakening control is limited. That is, it is possible to, while avoiding duty saturation of the motor, limit the d-axis current to an arbitrary value. In consequence, it is possible to lighten reduction in energy efficiency and lighten deterioration in motor operating noise.

(2) The d-axis current command value limitation unit 74 limits at least either the magnitude or the change rate of the d-axis current command value calculated by the d-axis current command value calculation unit 73. Limiting the magnitude of the d-axis current command value Id enables reduction in energy efficiency to be lightened and deterioration in motor operating noise to be lightened. Limiting the change rate of the d-axis current command value Id enables deterioration in motor operating noise to be lightened.

(3) The motor control device includes the first current command value calculation unit 40 configured to calculate a base q-axis current command value and the preceding-stage q-axis current command value limitation unit 72 configured to limit the base q-axis current command value calculated by the first current command value calculation unit 40 when the base q-axis current command value calculated by the first current command value calculation unit 40 exceeds a limit of a range in which the voltage command value can be controlled to the power supply voltage $V_R$ or less by field-weakening control. The d-axis current command value calculation unit 73 calculates a d-axis current command value, based on the q-axis current command value limited by the preceding-stage q-axis current command value limitation unit 72, and the succeeding-stage q-axis current command value limitation unit 75 further limits the q-axis current command value limited by the preceding q-axis current command value limitation unit 72.

This configuration enables the base q-axis current command value computed based on predetermined parameters (for example, steering torque Th and vehicle speed Vh) to be limited lest duty saturation occur.

Second Embodiment

Next, a second embodiment will be described. A motor control device of the second embodiment performs dead time compensation in order to compensate non-linear characteristics of motor current due to dead time of an inverter 48. In the dead time compensation, a compensation value equivalent to a dead time divided by a PWM cycle is added to duty values of PWM signals driving the inverter 48. For this reason, the motor control device of the second embodiment corrects a d-axis current command value Idw for field-weakening control, a limited q-axis current command value Iqr, and a q-axis current command value Iq*, based on a voltage obtained by reducing a voltage equivalent to a compensation in the dead time compensation from a power supply voltage VR lest duty saturation occur due to the added compensation value.

Figure 7:
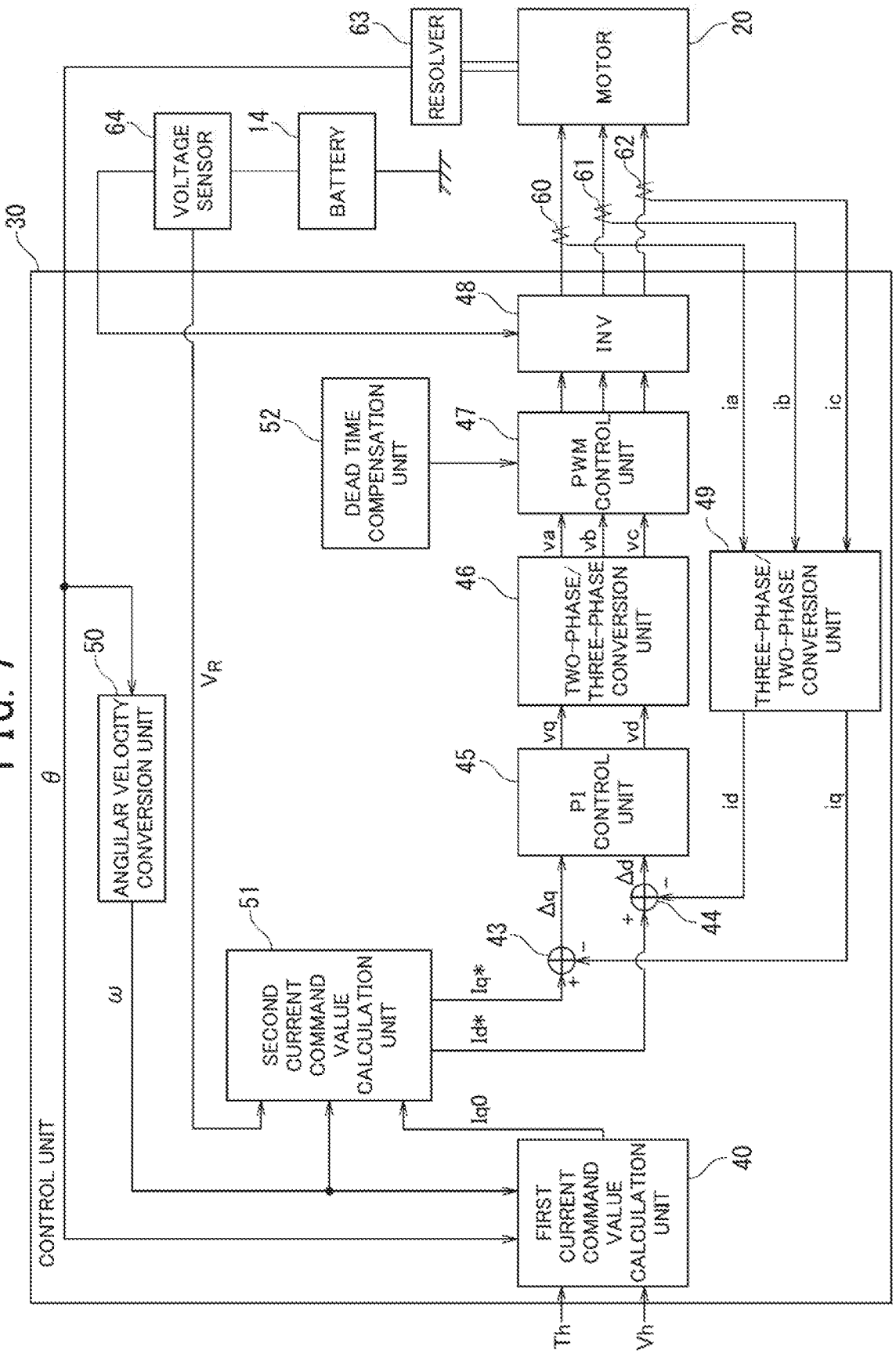
FIG. 7 is a block diagram illustrative of an example of a functional configuration of a control unit of a second embodiment.

See FIG. 7. A control unit 30 of the second embodiment has a similar configuration to that of the control unit of the first embodiment, and the same reference numerals are assigned to similar constituent components. The control unit 30 of the second embodiment includes a dead time compensation unit 52 configured to perform the dead time compensation.

The dead time compensation unit 52 outputs a compensation value equivalent to a dead time divided by a PWM cycle and given by the formula below to a PWM control unit 47.

[Math 6]

$$V_R \frac{DT}{PWM\_time}$$

In the above formula, DT and PWM time denote a dead time and a PWM cycle, respectively. The PWM control unit 47 adds the compensation value converted into a duty value to the duty values of PWM signals driving the inverter 48.

Figure 8:
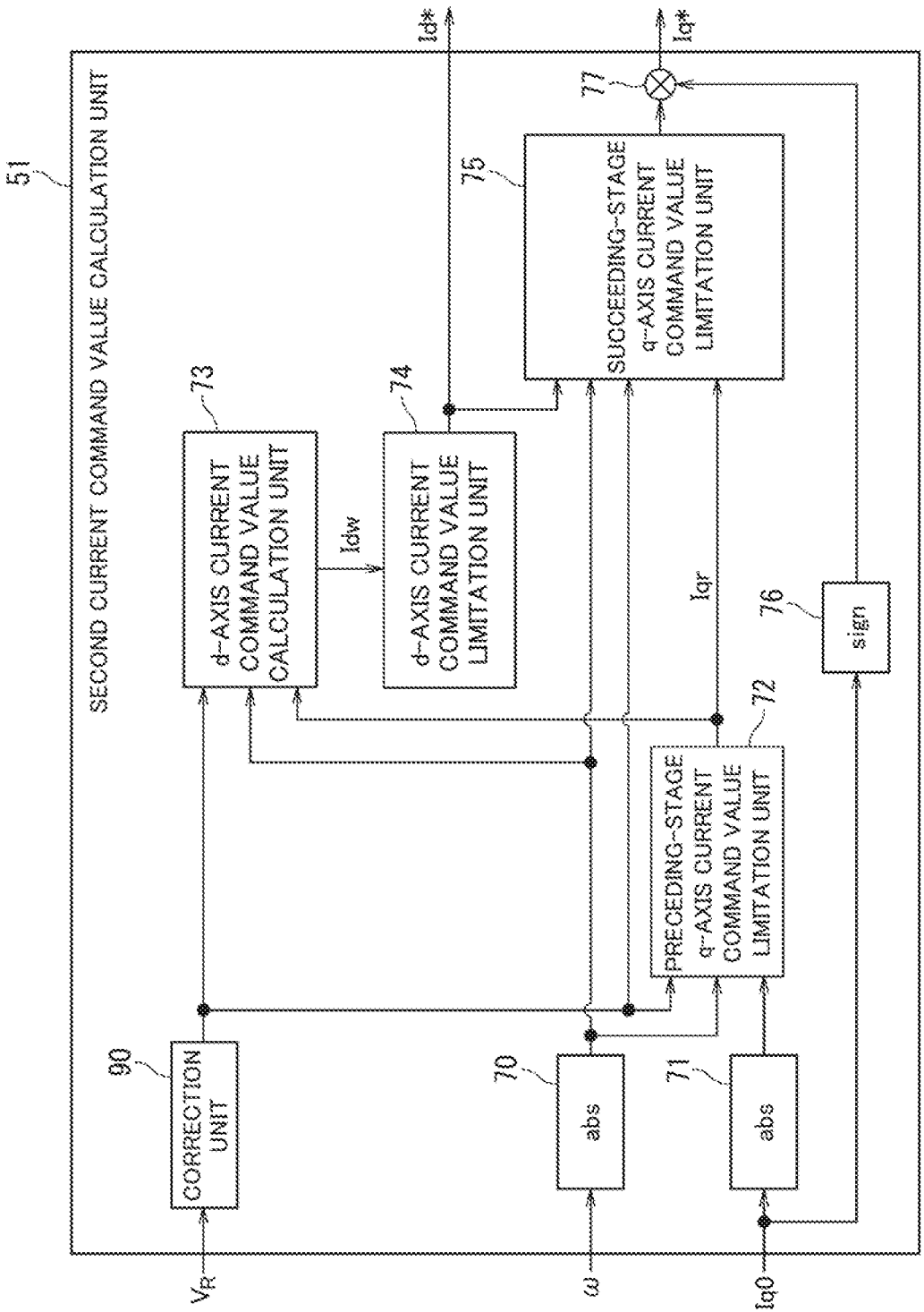
FIG. 8 is a block diagram illustrative of an example of a functional configuration of a second current command value calculation unit of the second embodiment.

See FIG. 8. A second current command value calculation unit 51 of the second embodiment has a similar configuration to that of the second current command value calculation unit 51 of the first embodiment, and the same reference numerals are assigned to similar constituent components. The second current command value calculation unit 51 of the second embodiment includes a correction unit 90.

The correction unit 90 computes a corrected voltage that is obtained by reducing a voltage equivalent to the compensation in the dead time compensation from the power supply voltage VR. The compensation value in the dead time compensation is both added and subtracted in the increasing and decreasing directions of the duty. For this reason, in order to correct the power supply voltage VR that is used for computing the d-axis current command value Idw for field-weakening control, the limited q-axis current command value Iqr, and the q-axis current command value Iq*, a value that is twice the above-described compensation value is subtracted from the power supply voltage VR.

Therefore, the correction unit 90 computes a value given by the equation below as a corrected voltage.

[Math 7]

$$V_R - V_R \frac{2DT}{PWM\_time} = V_R\left(1 - \frac{2DT}{PWM\_time}\right)$$

The correction unit 90 outputs the corrected voltage to a preceding-stage q-axis current command value limitation unit 72, a d-axis current command value calculation unit 73, and a succeeding-stage q-axis current command value limitation unit 75.

The preceding-stage q-axis current command value limitation unit 72 substitutes the corrected voltage into $V_R$ in the equation (3) above and determines whether or not a base q-axis current command value Iq0 exceeds a limit of a range in which duty saturation can be avoided by the field-weakening control.

In addition, the preceding-stage q-axis current command value limitation unit 72 computes a first q-axis current upper limit value IqLim1 by substituting the corrected voltage into $V_R$ in the equation (4) above.

The d-axis current command value calculation unit 73 computes the d-axis current command value Idw for field-weakening control by substituting the corrected voltage into $V_R$ in the equation (3) above.

The succeeding-stage q-axis current command value limitation unit 75 computes a second q-axis current upper limit value IqLim2 by substituting the corrected voltage into $V_R$ in the equation (5) above.

Advantageous Effects of Second Embodiment

The motor control device of the second embodiment includes the dead time compensation unit 52 configured to perform dead time compensation on the duty values of PWM signals driving the inverter 48, based on voltage command values. The d-axis current command value calculation unit 73 corrects the d-axis current command value Idw, based on a corrected voltage that is obtained by reducing a voltage equivalent to a compensation in the dead time compensation from the power supply voltage VR. The preceding-stage q-axis current command value limitation unit 72 and the succeeding-stage q-axis current command value limitation unit 75 respectively correct limited q-axis current command values, based on the corrected voltage.

This configuration enables the d-axis current command value Id* and the q-axis current command value Iq* to be corrected lest duty saturation occur even when a compensation value is added to the duty values of PWM signals due to the dead time compensation.

Variation

In a preceding-stage q-axis current command value limitation unit 72, a d-axis current command value calculation unit 73, and a succeeding-stage q-axis current command value limitation unit 75, calculation in accordance with the above-described equations (3), (4), and (5) is performed. In the calculation in accordance with the equations, three coefficients C1, C2, and C3 below appear in common.

[Math 8]

$$C1 = \frac{\omega^2 \Psi L}{(Ls+R)^2 + \omega^2 L^2},$$

$$C2 = \frac{V_R^2/3}{(Ls+R)^2 + \omega^2 L^2},$$

$$C3 = \frac{(Ls+R)\omega\Psi}{(Ls+R)^2 + \omega^2 L^2}$$

Computing the coefficients C1, C2, and C3 with respect to combinations of different values of power supply voltage $V_R$ and different values of motor rotational angular velocity ω in advance, storing the computed coefficients in a look-up table or a map, and reading the stored coefficients as required enable computational loads in the preceding-stage q-axis current command value limitation unit 72, the d-axis current command value calculation unit 73, and the succeeding-stage q-axis current command value limitation unit 75 to be reduced.

Note that, in PTL 1 described above, computation is performed neglecting differential operators under the assumption that temporal variation is small. However, in application fields, such as an electrically driven power steering device, torque and rotational angular velocity are likely to suddenly change and current command values easily undergo a sudden change. Therefore, for suppression of duty saturation, it is desirable to perform calculation with differential operators taken into consideration and appropriately respond to variation of input variables.

A motor control device of the variation is capable of determining values of the coefficients C1, C2, and C3 by treating the coefficients C1, C2, and C3 as filters that are represented by different second-order transfer functions and have, as coefficients of the filters, values calculated using values of the power supply voltage $V_R$ or the corrected voltage and the motor rotational angular velocity $\omega$, which change at all times, and inductance L, motor resistance R, and the number of flux linkages $\Psi$, which are system parameters, and computing, in discrete time, outputs from the filters when, for example, inputs are fixed to "1". Since this configuration enables computation to be performed without neglecting differential operators, it is possible to cope with a sudden change in the current command value. In addition, it becomes unnecessary to use a large-size look-up table or map for storing data.

An achievement method of a second-order transfer function in a continuous-time system will now be described. A general transfer function is expressed by the equation (6).

[Math 9]

$$C = \frac{b_m s^m + b_{m-1} s^{m-1} + \ldots + b_1 s + b_0}{s^n + a_{n-1} s^{n-1} + \ldots + a_1 s + a_0} \quad (6)$$

$$= \frac{b_m s^{m-n} + b_{m-1} s^{m-(n+1)} + \ldots + b_1 s^{1-n} + b_0 s^{-n}}{1 + a_{n-1} s^{-1} + \ldots + a_1 s^{1-n} + a_0 s^{-n}}$$

When it is assumed that $m=n-1$, the equation (7) below is derived.

[Math 10]

$$C = \frac{b_{n-1} s^{-1} + b_{n-2} s^{-2} + \ldots + b_1 s^{1-n} + b_0 s^{-n}}{1 + a_{n-1} s^{-1} + \ldots + a_1 s^{1-n} + a_0 s^{-n}} \quad (7)$$

Figure 10:
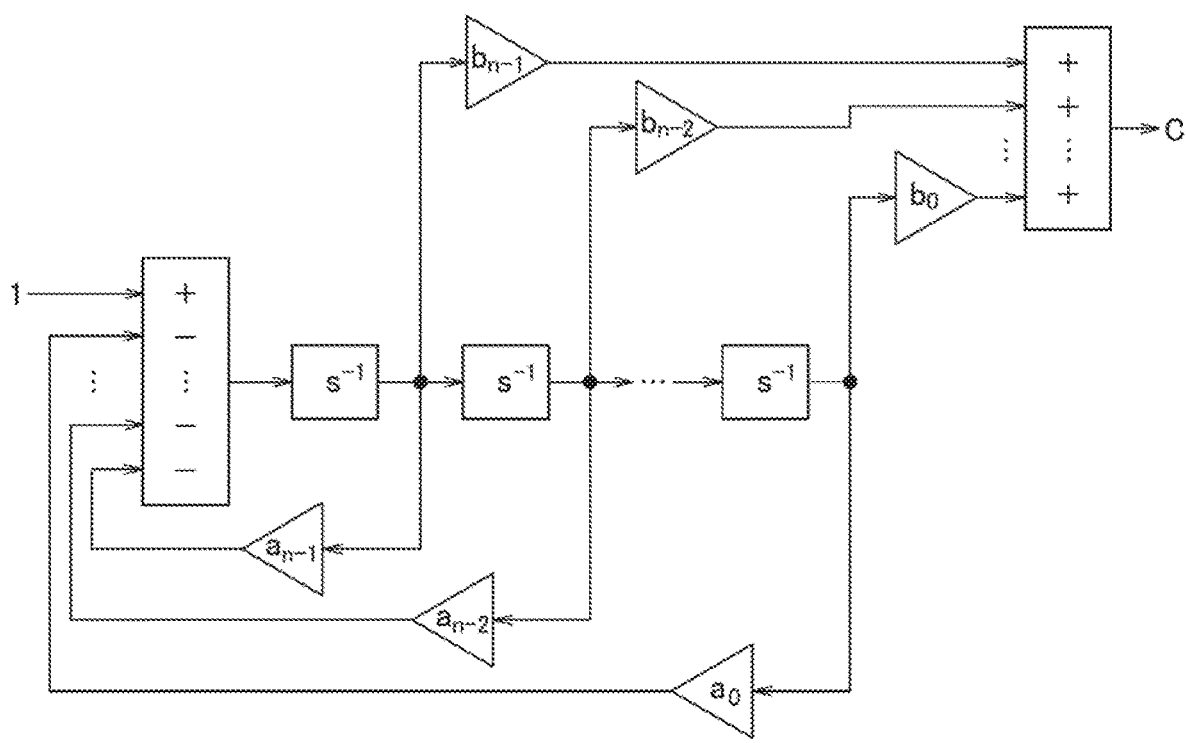
FIG. 10 is a block diagram illustrative of an example of a general transfer function filter configuration in the second embodiment.

The equation (7) can be illustrated in a block diagram in FIG. 10 in which an input is assumed to be 1.

When, using C1 as an example, coefficients of a filter are calculated, the equations (8) and (9) below can be obtained.

[Math 11]

$$C1 = \frac{\omega^2 \Psi L}{(Ls+R)^2 + \omega^2 L^2} = \frac{\frac{\omega^2 \Psi}{L}}{s^2 + \frac{2R}{L} s + \left(\frac{R}{L}\right)^2 + \omega^2} \quad (8)$$

Since n=2,

[Math 12]

$$b_1 = 0, \quad (9)$$
$$b_0 = \frac{\omega^2 \Psi}{L},$$
$$a_1 = \frac{2R}{L},$$
$$a_0 = \left(\frac{R}{L}\right)^2 + \omega^2$$

are obtained. The coefficients of C2 and C3 can also be obtained in a similar manner. In addition, a continuous-time system transfer function can be converted into a discrete-time system transfer function, using a known method.

Figure 9:
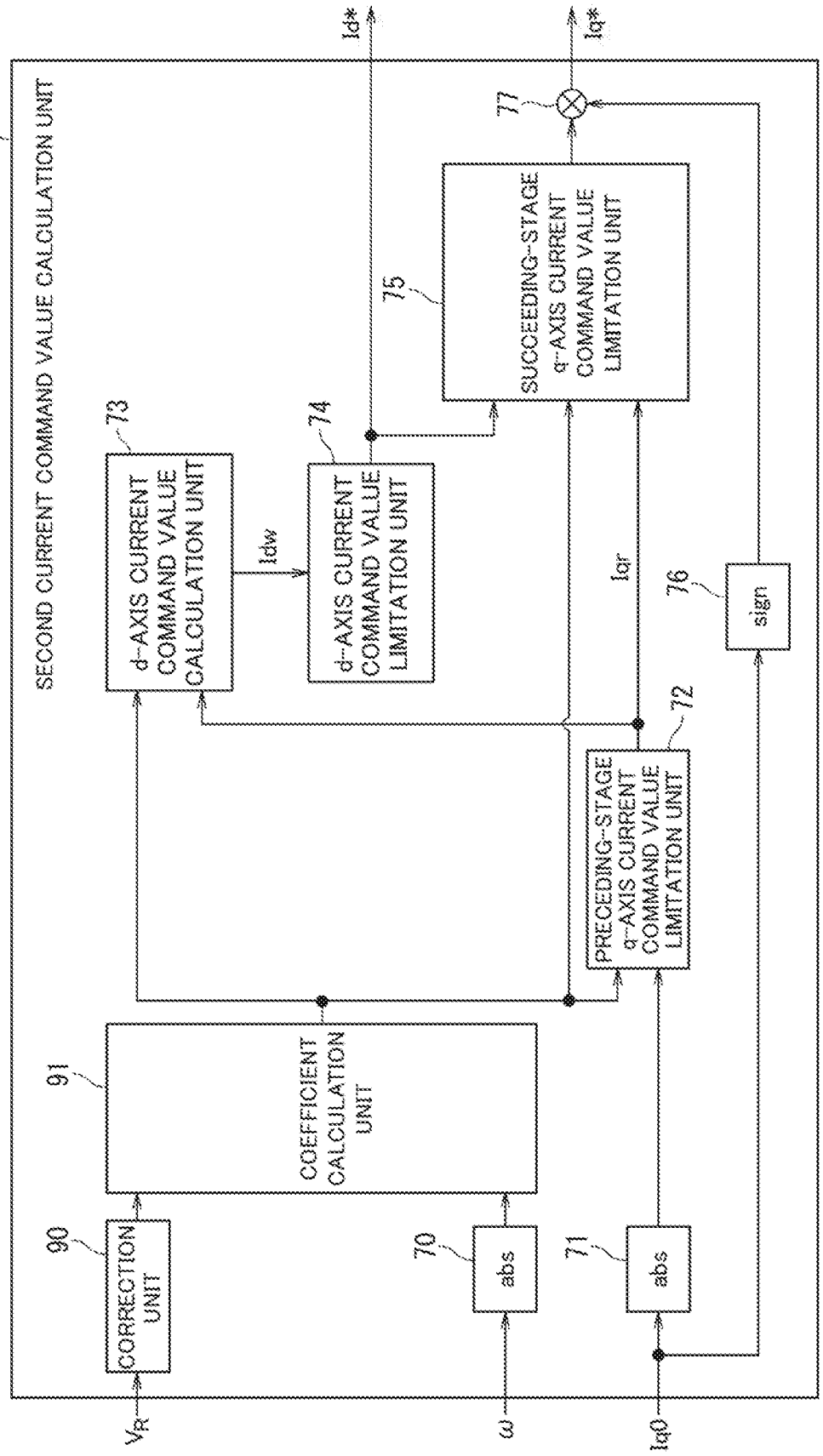
FIG. 9 is a block diagram illustrative of an example of a functional configuration of a variation of the second current command value calculation unit of the second embodiment.

See FIG. 9. A second current command value calculation unit 51 of the variation has a similar configuration to that of the second current command value calculation unit 51 of the second embodiment, and the same reference numerals are assigned to similar constituent components.

The second current command value calculation unit 51 of the variation includes a coefficient calculation unit 91. The coefficient calculation unit 91 includes filters represented by the afore-described second-order transfer functions and configured to take a corrected voltage value of the power supply voltage $V_R$ and the motor rotational angular velocity $\omega$, as inputs, and calculate the coefficients C1, C2, and C3.

The coefficient calculation unit 91 takes a corrected voltage value of the power supply voltage $V_R$ detected by a voltage sensor 64 and the rotational angular velocity $\omega$ of a motor 20 computed by an angular velocity conversion unit 50, as inputs, obtains the coefficients C1, C2, and C3 by calculating the second-order transfer function filters each time, and outputs the obtained coefficients C1, C2, and C3 to the preceding-stage q-axis current command value limitation unit 72, the d-axis current command value calculation unit 73, and the succeeding-stage q-axis current command value limitation unit 75.

The preceding-stage q-axis current command value limitation unit 72 operates the above-described equation (4), using the coefficients C2 and C3, which were output by the coefficient calculation unit 91. The d-axis current command value calculation unit 73 operates the above-described equation (3), using the coefficients C1, C2, and C3, which were output by the coefficient calculation unit 91. The succeeding-stage q-axis current command value limitation unit 75 operates the above-described equation (5), using the coefficients C1, C2, and C3, which were output by the coefficient calculation unit 91.

Calculating the coefficients C1, C2, and C3 by use of such transfer functions using "1" as inputs thereto and using the calculated coefficients C1, C2, and C3 in the respective calculation units enable the coefficients C1, C2, and C3 that appropriately respond to the power supply voltage and the rotational angular velocity to be obtained without neglecting differential operators and without increasing a computational load and a data storage area. This method is applicable to not only the second current command value calculation unit but also other functions.

Note that a coefficient calculation unit 91 may be included in the above-described first embodiment and a coefficient calculation unit 91 may also be included in a third embodiment, which will be described later.

Third Embodiment

Next, a third embodiment will be described. A preceding-stage q-axis current command value limitation unit 72 and a succeeding-stage q-axis current command value limitation unit 75 limit q-axis current, based on power supply voltage $V_R$ and rotational angular velocity $\omega$ of a motor 20.

For this reason, when the q-axis current is limited, noise components contained in the rotational angular velocity $\omega$ and the power supply voltage $V_R$ have an influence on a q-axis current command value and serve as a cause that causes torque variation. Thus, when the q-axis current is limited, it is necessary to reduce responsiveness to the rotational angular velocity wand the power supply voltage $V_R$ and thereby suppress noise.

On the other hand, there is a concern that, when the responsiveness to the rotational angular velocity $\omega$ and the power supply voltage $V_R$ is low, input of d-axis current and limitation of the q-axis current may be delayed when the rotational angular velocity $\omega$ and the power supply voltage $V_R$ suddenly change, which may cause duty saturation to occur and motor operating noise to deteriorate.

For this reason, a motor control device of the third embodiment computes the amount of margin in the q-axis current command value until the q-axis current command value is limited by the preceding-stage q-axis current command value limitation unit 72 or the succeeding-stage q-axis current command value limitation unit 75.

Responsiveness of the preceding-stage q-axis current command value limitation unit 72 or the succeeding-stage q-axis current command value limitation unit 75 to the rotational angular velocity $\omega$ and the power supply voltage $V_R$ is changed according to the amount of margin. For example, characteristics of a filter removing noise from the rotational angular velocity $\omega$ and the power supply voltage $V_R$ are changed according to the amount of margin.

This configuration enables, when the q-axis current is not limited, the responsiveness to be raised and input of the d-axis current and limitation of the q-axis current to be thereby promptly started and, when the q-axis current is limited, the responsiveness to be lowered and torque variation due to noise to be thereby prevented.

Figure 11:
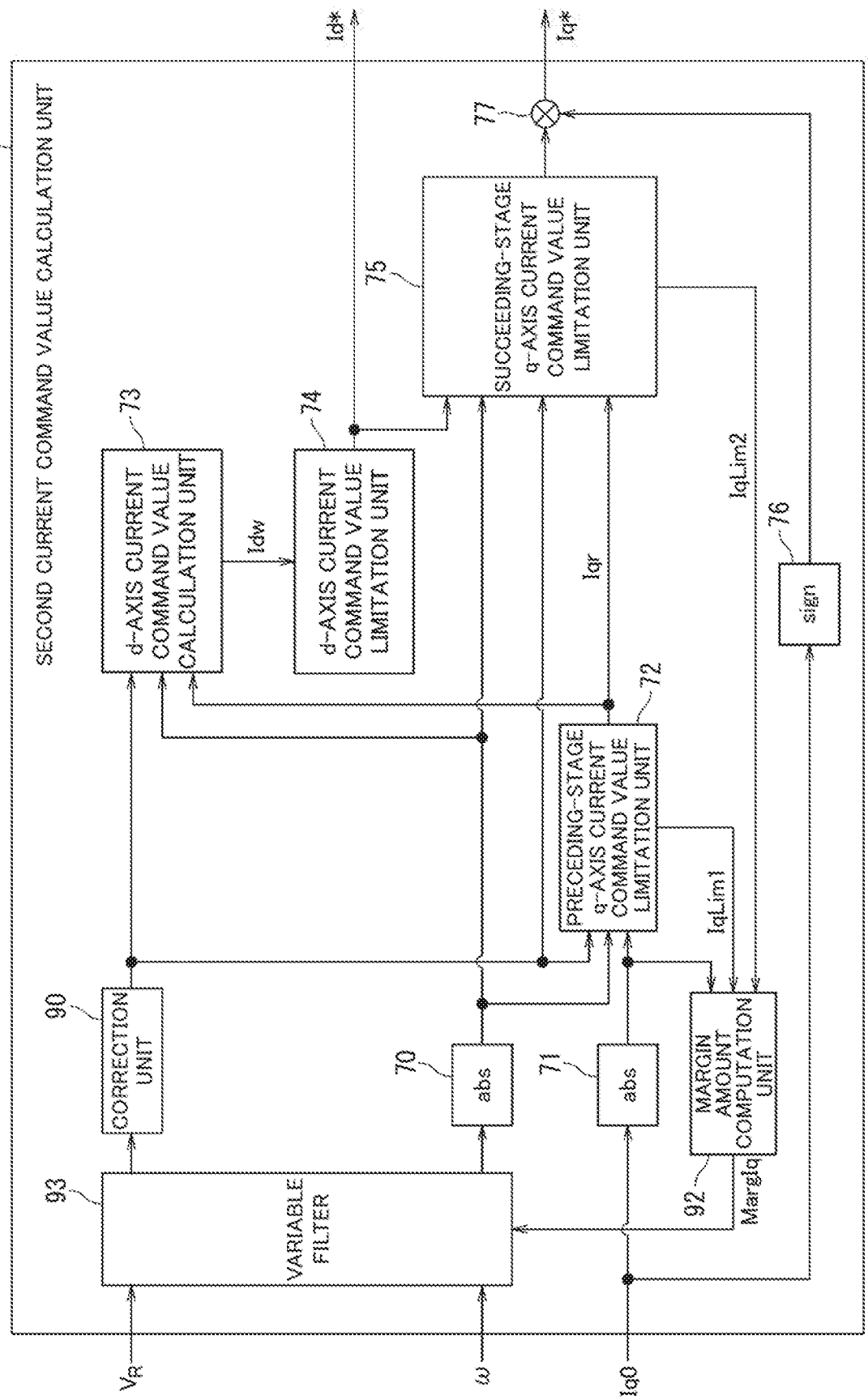
FIG. 11 is a block diagram illustrative of an example of a functional configuration of a second current command value calculation unit of a third embodiment.

See FIG. 11. A second current command value calculation unit 51 of the third embodiment has a similar configuration to that of the second current command value calculation unit 51 of the second embodiment, and the same reference numerals are assigned to similar constituent components.

The second current command value calculation unit 51 of the third embodiment includes a margin amount computation unit 92 and a variable filter 93.

The margin amount computation unit 92 receives a first q-axis current upper limit value IqLim1 computed by the preceding-stage q-axis current command value limitation unit 72, a second q-axis current upper limit value IqLim2 computed by the succeeding-stage q-axis current command value limitation unit 75, and a base q-axis current command value Iq0.

The margin amount computation unit 92 computes, as the amount MargIq of margin, a difference that is obtained by subtracting the base q-axis current command value Iq0 from a smaller one of the first q-axis current upper limit value IqLim1 and the second q-axis current upper limit value IqLim2.

$$MargIq = \min(IgLim1, IqLim2) - Iq0 \qquad \text{[Math 13]}$$

The relationship MargIq≥0 means that no limitation on the q-axis current has occurred, and, the closer MargIq comes to 0, the closer the q-axis current approaches to the start point of the limitation thereon. In addition, the relationship MargIq<0 means that the q-axis current is limited.

The variable filter 93 is a filter configured to remove noise by removing high frequency components from the rotational angular velocity $\omega$ and the power supply voltage $V_R$. The variable filter 93 may be a low-pass filter (LPF) or a weighted-average filter.

The variable filter 93 changes a cutoff frequency according to MargIq. This configuration enables responsiveness of the preceding-stage q-axis current command value limitation unit 72 or the succeeding-stage q-axis current command value limitation unit 75 to the rotational angular velocity $\omega$ and the power supply voltage $V_R$ to be changed depending on a limitation state of the q-axis current.

For example, as MargIq increases, the variable filter 93 raises the cutoff frequency and thereby increases the responsiveness. In addition, as MargIq decreases, the variable filter 93 lowers the cutoff frequency and thereby decreases the responsiveness.

Note that the variable filter 93 may check only a magnitude relation between min(IqLim1, IqLim2) and Iq0 and thereby discriminate whether or not the q-axis current is limited and, depending on a result of the discrimination, change the cutoff frequency of the filter.

Note, however, that gradually changing the cutoff frequency according to the value of MargIq as described above enables gentle filter characteristics to be achieved such as gradually lowering the responsiveness of the filter as the start of the limitation of the q-axis current approaches.

Note that the variable filter 93 is an example of a responsiveness change unit described in CLAIMS.

Advantageous Effects of Third Embodiment

The motor control device of the third embodiment includes the margin amount computation unit 92 configured to compute the amount MargIq of margin in the q-axis current command value until the q-axis current command value is limited by the preceding-stage q-axis current command value limitation unit 72 or the succeeding-stage q-axis current command value limitation unit 75 and the variable filter 93 configured to change, according to the amount MargIq of margin, responsiveness of the preceding-stage q-axis current command value limitation unit 72 and the succeeding-stage q-axis current command value limitation unit 75 to change in the rotational angular velocity $\omega$ of the motor 20 and change in the power supply voltage $V_R$.

This configuration enables, when the q-axis current is not limited, the responsiveness to be raised and input of the d-axis current and limitation of the q-axis current to be thereby promptly started and, when the q-axis current is limited, the responsiveness to be lowered and torque variation due to noise to be thereby prevented.

Fourth Embodiment

In the first embodiment, the calculation formulae were defined under the assumption that a motor is in a powering state (the direction of a q-axis current command value coincides with the direction of motor rotation). In a fourth embodiment, calculation in consideration of a motor being in a regenerative state (the direction of the q-axis current command value does not coincide with the direction of the motor rotation) will be described.

In the calculation of a d-axis current command value, the equation (3) can be used in both cases of the powering state and the regenerative state. Since, when the motor is in the regenerative state, the signs of the q-axis current command value and rotational angular velocity differ from each other, the value of the square root in the equation (3) increases. For this reason, d-axis current when the motor is in the regenerative state has a value on the positive side as compared with the d-axis current when the motor is in the powering state with respect to the same q-axis current. That is because, when the motor is in the regenerative state, the q-axis current has an opposite phase to that of back electromotive force and the d-axis current does not have to be flowed in order to cancel voltage.

Next, a limit value to be used for limiting the absolute value of a base q-axis current command value Iq0 in a preceding-stage q-axis current command value limitation unit 72 will be described.

First, when the motor is in the powering state, the preceding-stage q-axis current command value limitation unit 72 limits the absolute value of the base q-axis current command value Iq0, using a first q-axis current upper limit value IqLim1 that is computed using the equation (4) above, as described above.

On the other hand, when the motor is in the regenerative state, depending on the magnitude relation between the magnitude of a q-axis current command value Iq and the magnitude of the following term including rotational angular velocity ω (that is, a current component generated by back electromotive voltage of a motor 20):

[Math 14]

$$\frac{(Ls+R)\omega\Psi}{(Ls+R)^2+\omega^2L^2}$$

in the second term in the square root of the equation (3), a condition based on which a value in the square root of the equation (3) becomes positive has different forms.

Thus, when, in consideration of the sign of the q-axis current command value Iq and the sign of the rotational angular velocity ω, a range of the q-axis current command value Iq in which the value in the square root of the equation (3) becomes positive is calculated, the equations (10) to (13) described below are obtained.

When, with respect to the base q-axis current command value Iq0, Iq0≥0 and

[Math 15]

$$|Iq0| \geq \left|\frac{(Ls+R)\omega\Psi}{(Ls+R)^2+\omega^2L^2}\right|$$

hold, the equation below is obtained.

[Math 16]

$$|Iq0| \leq \sqrt{\frac{V_R^2/3}{(Ls+R)^2+\omega^2L^2}} + \frac{(L_s+R)|\omega|\Psi}{(Ls+R)^2+\omega^2L^2} \quad (10)$$

When, with respect to the base q-axis current command value Iq0, Iq0≥0 and

[Math 17]

$$|Iq0| < \left|\frac{(Ls+R)\omega\Psi}{(Ls+R)^2+\omega^2L^2}\right|$$

hold, the equation below is obtained.

[Math 18]

$$Iq \geq -\sqrt{\frac{V_R^2/3}{(Ls+R)^2+\omega^2L^2}} + \frac{(L_s+R)|\omega|\Psi}{(Ls+R)^2+\omega^2L^2} \quad (11)$$

When, with respect to the base q-axis current command value Iq0, Iq0<0 and

[Math 19]

$$|Iq0| \geq \left|\frac{(Ls+R)\omega\Psi}{(Ls+R)^2+\omega^2L^2}\right|$$

hold, the equation below is obtained.

[Math 20]

$$Iq \geq -\sqrt{\frac{V_R^2/3}{(Ls+R)^2+\omega^2L^2}} - \frac{(L_s+R)|\omega|\Psi}{(Ls+R)^2+\omega^2L^2} \quad (12)$$

When, with respect to the base q-axis current command value Iq0, Iq0<0 and

[Math 21]

$$|Iq0| < \left|\frac{(Ls+R)\omega\Psi}{(Ls+R)^2+\omega^2L^2}\right|$$

hold, the equation below is obtained.

[Math 22]

$$Iq \leq -\sqrt{\frac{V_R^2/3}{(Ls+R)^2+\omega^2L^2}} - \frac{(L_s+R)|\omega|\Psi}{(Ls+R)^2+\omega^2L^2} \quad (13)$$

When the equations (10) to (13) are reformulated in such a way as to limit the absolute value of the q-axis current command value Iq, the equations (14) to (16) are obtained.

Depending on whether or not the equation (14) holds, that is, the magnitude relation between the magnitude of the q-axis current command value and the magnitude of the term including the rotational angular velocity (a current component generated by back electromotive voltage), the absolute value of the base q-axis current command value Iq0 is limited through different processing in such a way that the absolute value of the q-axis current command value Iq is limited by an upper limit value as expressed by the equation (15) below or the absolute value of the base q-axis current command value Iq0 is limited by a lower limit value as expressed by the equation (16) below.

[Math 23]

$$|Iq0| \geq \left| \frac{(Ls+R)\omega\Psi}{(Ls+R)^2 + \omega^2 L^2} \right| \tag{14}$$

When the equation (14) holds, the equation below is used.

[Math 24]

$$Iq \leq \sqrt{\frac{V_R^2/3}{(Ls+R)^2 + \omega^2 L^2}} + \frac{(L_s+R)|\omega|\Psi}{(Ls+R)^2 + \omega^2 L^2} \tag{15}$$

When the equation (14) does not hold, the equation below is used.

[Math 25]

$$Iq \geq -\sqrt{\frac{V_R^2/3}{(Ls+R)^2 + \omega^2 L^2}} + \frac{(L_s+R)|\omega|\Psi}{(Ls+R)^2 + \omega^2 L^2} \tag{16}$$

That is, when the equation (14) above holds, the upper limit value of the absolute value of the base q-axis current command value Iq0 is limited using a first q-axis current upper limit value IqLim1 that is obtained using the equation (17) below.

On the other hand, when the equation (14) above does not hold, the lower limit value of the absolute value of the base q-axis current command value Iq0 is limited using a first q-axis current lower limit value IqLim3 that is obtained using the equation (18) below.

As with the first embodiment, when the q-axis current command value Iq* is calculated, processing that makes the sign of the base q-axis current command value Iq0 coincide with the sign of the q-axis current command value Iq* is performed.

[Math 26]

$$IqLim1 = \sqrt{\frac{V_R^2/3}{(Ls+R)^2 + \omega^2 L^2}} + \frac{(L_s+R)|\omega|\Psi}{(Ls+R)^2 + \omega^2 L^2} \tag{17}$$

$$IqLim3 = -\sqrt{\frac{V_R^2/3}{(Ls+R)^2 + \omega^2 L^2}} + \frac{(L_s+R)|\omega|\Psi}{(Ls+R)^2 + \omega^2 L^2} \tag{18}$$

Next, a limit value to be used for limiting a limited q-axis current command value Iqr in a succeeding-stage q-axis current command value limitation unit 75 will be described.

First, when the motor is in the powering state, the limited q-axis current command value Iqr is limited using a second q-axis current upper limit value IqLim2 that is computed using the equation (5).

On the other hand, when the motor is in the regenerative state, by performing expansion of equations in a similar manner to the above description with respect to the preceding q-axis current command value limitation unit 72, a second q-axis current upper limit value IqLim2 by which the upper limit value of the limited q-axis current command value Iqr is limited and a second q-axis current lower limit value IqLim4 by which the lower limit value of the limited q-axis current command value Iqr is limited can be computed using the equations (19) and (20) below.

When the equation (14) holds, the equation below is obtained.

[Math 27]

$$IqLim2 = \frac{(Ls+R)|\omega|\Psi}{(Ls+R)^2 + \omega^2 L^2} + \sqrt{\frac{V_R^2/3}{(Ls+R)^2 + \omega^2 L^2} - \left(Id + \frac{(L_s+R)|\omega|\Psi}{(Ls+R)^2 + \omega^2 L^2}\right)^2} \tag{19}$$

When the equation (14) does not hold, the equation below is obtained.

[Math 28]

$$IqLim4 = \frac{(Ls+R)|\omega|\Psi}{(Ls+R)^2 + \omega^2 L^2} - \sqrt{\frac{V_R^2/3}{(Ls+R)^2 + \omega^2 L^2} - \left(Id + \frac{(L_s+R)|\omega|\Psi}{(Ls+R)^2 + \omega^2 L^2}\right)^2} \tag{20}$$

Figure 12:
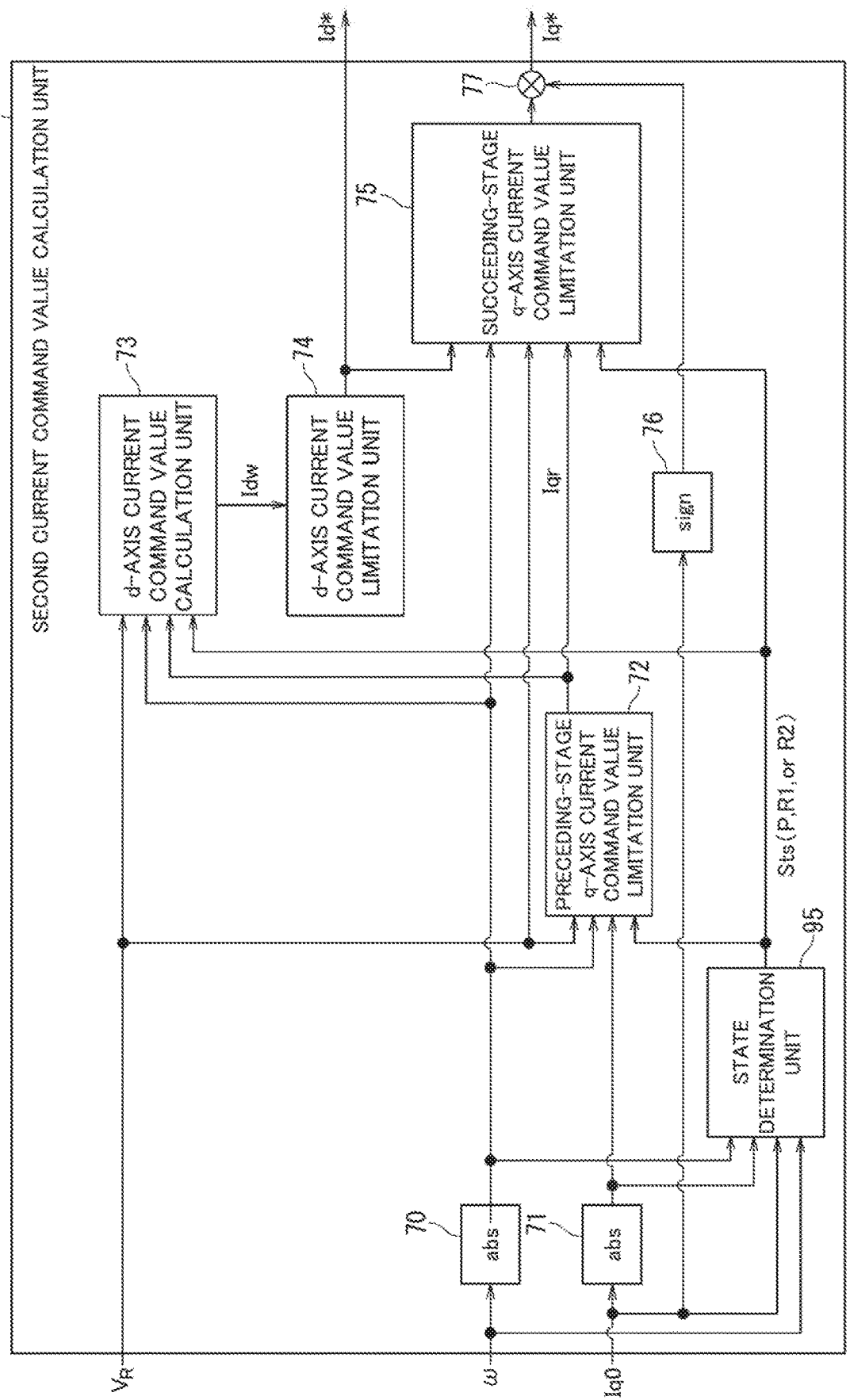
FIG. 12 is a block diagram illustrative of an example of a functional configuration of a second current command value calculation unit of a fourth embodiment.

See FIG. 12. A second current command value calculation unit 51 of the fourth embodiment has a similar configuration to that of the second current command value calculation unit 51 of the first embodiment, and the same reference numerals are assigned to similar constituent components. The second current command value calculation unit 51 of the fourth embodiment includes a state determination unit 95

To the state determination unit 95, the base q-axis current command value Iq0, the rotational angular velocity ω, and the absolute values thereof are input. The state determination unit 95 determines, from a relation between the signs of the base q-axis current command value Iq0 and the rotational angular velocity ω, the powering state (the signs are coincident with each other) or the regenerative state (the signs are not coincident with each other).

When the motor 20 is determined to be in the powering state, a state Sts is set at "P". When the motor 20 is determined to be in the regenerative state, the state determination unit 95 determines whether or not the equation (14) above holds. When the motor 20 is in the regenerative state and the equation (14) above holds, the state determination unit 95 sets the state Sts at "R1", and, when the motor 20 is in the regenerative state and the equation (14) above does not hold, the state determination unit 95 sets the state Sts at "R2".

The state determination unit 95 inputs the state Sts to the preceding-stage q-axis current command value limitation unit 72, the succeeding-stage q-axis current command value limitation unit 75, and a d-axis current command value calculation unit 73.

The preceding-stage q-axis current command value limitation unit 72 checks the state Sts, computes the first q-axis current upper limit value IqLim1, using the equation (4) above when the state Sts is "P" and the equation (17) above when the state Sts is "R1", and limits the upper limit value of the absolute value of the base q-axis current command value Iq0, using the first q-axis current upper limit value IqLim1.

On the other hand, when the state Sts is "R2", the preceding-stage q-axis current command value limitation unit 72 computes the first q-axis current lower limit value IqLim3, using the equation (18) above and limits the lower limit value of the absolute value of the base q-axis current command value Iq0, using the first q-axis current lower limit value IqLim3.

Although the d-axis current command value calculation unit 73 calculates a d-axis current command value Idw, using the equation (3) above, the d-axis current command value calculation unit 73 switches the sign of the rotational angular velocity term in the second term in the square root of the equation (3) above depending on the state Sts. When the state Sts is "P", the sign is set to positive, and, otherwise, set to negative. This setting is processing in which it is taken into consideration that, when the motor is in the regenerative state, the signs of the q-axis current command value and the rotational angular velocity are not coincident with each other.

The succeeding-stage q-axis current command value limitation unit 75 checks the state Sts, computes the second q-axis current upper limit value IqLim2, using the equation (5) above when the state Sts is "P" and the equation (19) above when the state Sts is "R1", and limits the upper limit value of the limited q-axis current command value Iqr, using the second q-axis current upper limit value IqLim2.

On the other hand, when the state Sts is "R2", the succeeding-stage q-axis current command value limitation unit 75 computes the second q-axis current lower limit value IqLim4, using the equation (20) above and limits the lower limit value of the limited q-axis current command value Iqr, using the second q-axis current lower limit value IqLim4.

Advantageous Effects of Fourth Embodiment

The motor control device of the fourth embodiment includes the state determination unit 95 configured to, when the motor is in the powering state or the regenerative state, discriminate the two states that can be discriminated from each other depending on the magnitude relation between the magnitudes of the q-axis current command value and the term of the rotational angular velocity (a current component generated by back electromotive voltage) and compute the discriminated state as the state Sts and the preceding-stage q-axis current command value limitation unit 72 and the succeeding-stage q-axis current command value limitation unit 75 configured to set an upper limit value or a lower limit value for the q-axis current command value depending on the state Sts and limit the q-axis current command value.

This configuration enables duty saturation to be avoided when the motor is in any of the powering state and the regenerative state.

Although examples in which motor control devices of the embodiments of the present invention are applied to an electrically driven power steering device that provides steering assist force to the steering system of a vehicle, using a motor were described above, the present invention is not limited to the examples. The motor control devices of the embodiments of the present invention can be applied to various electrically driven actuator products that produce driving force, using a motor.

REFERENCE SIGNS LIST

1 Steering wheel
2 Column shaft
3 Reduction gear
4A Universal joint
4B Universal joint
5 Rack-and-pinion mechanism
6 Tie rod
10 Torque sensor
11 Ignition key
12 Vehicle speed sensor
14 Battery
20 Motor
30 Control unit
40 First current command value calculation unit
43, 44 Subtractor
45 PI control unit
46 Two-phase/three-phase conversion unit
47 PWM control unit
48 Inverter
49 Three-phase/two-phase conversion unit
50 Angular velocity conversion unit
51 Second current command value calculation unit
52 Dead time compensation unit
60, 61, 62 Current sensor
63 Resolver
64 Voltage sensor
70, 71 Absolute value computation unit
72 Preceding-stage q-axis current command value limitation unit
73 d-axis current command value calculation unit
74 d-axis current command value limitation unit
75 Succeeding-stage q-axis current command value limitation unit
76 Sign detection unit
77 Multiplication unit
90 Correction unit
91 Coefficient calculation unit
92 Margin amount computation unit
93 Variable filter
95 State determination unit

The invention claimed is:

1. A motor control device comprising:
a voltage command value calculation unit configured to calculate a voltage command value of voltage applied to a motor, based on a q-axis current command value and a d-axis current command value;
a driving circuit configured to output driving power to the motor, based on the voltage command value;
a d-axis current command value calculation unit configured to calculate the d-axis current command value limiting the voltage command value to a maximum voltage applicable to the driving circuit or less by field-weakening control;
a q-axis current command value calculation unit configured to calculate the q-axis current command value;
a d-axis current command value limitation unit configured to limit the d-axis current command value calculated by the d-axis current command value calculation unit;
a q-axis current command value limitation unit configured to limit the q-axis current command value lest the voltage command value exceed the maximum voltage due to limitation of the d-axis current command value by the d-axis current command value limitation unit; and
a second q-axis current command value limitation unit configured to limit the q-axis current command value calculated by the q-axis current command value calculation unit when the q-axis current command value calculated by the q-axis current command value calculation unit exceeds a limit of a range in which the voltage command value can be controlled to the maximum voltage or less by field-weakening control, wherein the d-axis current command value calculation unit calculates the d-axis current command value, based on the q-axis current command value limited by the second q-axis current command value limitation unit, and the q-axis current command value limitation unit further limits the q-axis current command value limited b the second q-axis current command value limitation unit.

2. The motor control device according to claim 1, wherein the d-axis current command value limitation unit limits at least either a magnitude or a change rate of the d-axis current command value calculated by the d-axis current command value calculation unit.

3. The motor control device according to claim 1, wherein the d-axis current command value calculation unit calculates the d-axis current command value, based on a first calculation formula using rotational angular velocity of the motor and power supply voltage as variables, the second q-axis current command value limitation unit limits the q-axis current command value calculated by the q-axis current command value calculation unit, using a first q-axis limit value calculated based on a second calculation formula using the rotational angular velocity of the motor and the power supply voltage as variables, and the q-axis current command value limitation unit limits the q-axis current command value limited by the second q-axis current command value limitation unit, using a second q-axis limit value calculated based on a third calculation formula using the rotational angular velocity of the motor and the power supply voltage as variables, the motor control device comprising a coefficient calculation unit configured to calculate a coefficient common to the first calculation formula, the second calculation formula, and the third calculation formula, wherein the coefficient calculation unit calculates, as the common coefficient, an output when a predetermined value is input to a second-order transfer function filter including at least the rotational angular velocity of the motor and the power supply voltage as coefficients.

4. The motor control device according to claim 1 comprising a dead time compensation unit configured to perform dead time compensation on a duty value of a PWM signal driving the driving circuit, based on the voltage command value, wherein the d-axis current command value calculation unit corrects the d-axis current command value, based on a corrected voltage obtained by reducing a voltage equivalent to a compensation in the dead time compensation from applied voltage to the driving circuit, and the q-axis current command value limitation unit and the second q-axis current command value limitation unit respectively correct the q-axis current command values limited by the q-axis current command value limitation unit and the second q-axis current command value limitation unit, respectively, based on the corrected voltage.

5. The motor control device according to claim 1 comprising:

a margin amount computation unit configured to compute an amount of margin until the q-axis current command value is limited by the q-axis current command value limitation unit or the second q-axis current command value limitation unit; and a responsiveness change unit configured to change, according to the amount of margin, responsiveness of the q-axis current command value limitation unit and the second q-axis current command value limitation unit to a change in the rotational angular velocity of the motor and a change in the applied voltage to the driving circuit.

6. The motor control device according to claim 1 comprising a state determination unit configured to, when the motor is in a regenerative state, determine a magnitude relation between a magnitude of the q-axis current command value calculated by the q-axis current command value calculation unit and a magnitude of a current component generated by back electromotive voltage of the motor, wherein the q-axis current command value limitation unit and the second q-axis current command value limitation unit determine whether the q-axis current command value is limited by an upper limit value or a lower limit value depending on the magnitude relation determined by the state determination unit.

7. An electrically driven actuator product comprising:
a motor control device according to claim 1; and
a motor configured to be controlled by the motor control device.

8. An electrically driven power steering device comprising:
a motor control device according to claim 1; and
a motor configured to be controlled by the motor control device,
the electrically driven power steering device providing a steering system of a vehicle with steering assist force, using the motor.

* * * * *